(12) United States Patent
Murphy et al.

(10) Patent No.: US 11,670,922 B2
(45) Date of Patent: Jun. 6, 2023

(54) POWER AND/OR DATA CONNECTIVITY TRACK SYSTEM

(71) Applicants: Paul Murphy, Hamden, CT (US); Anna Juskow, Yonkers, NY (US)

(72) Inventors: Paul Murphy, Hamden, CT (US); Anna Juskow, Yonkers, NY (US)

(73) Assignee: MVVP LLC, Hamden, CT (US)

( * ) Notice: Subject to any disclaimer, the term of this patent is extended or adjusted under 35 U.S.C. 154(b) by 0 days.

(21) Appl. No.: 17/514,875

(22) Filed: Oct. 29, 2021

(65) Prior Publication Data

US 2023/0139027 A1    May 4, 2023

(51) Int. Cl.
*H02G 3/04*    (2006.01)
*H01R 24/84*    (2011.01)
*H01R 105/00*    (2006.01)

(52) U.S. Cl.
CPC ........... *H02G 3/0456* (2013.01); *H01R 24/84* (2013.01); *H02G 3/0418* (2013.01); *H01R 2105/00* (2013.01)

(58) Field of Classification Search
CPC ...... H02G 3/0418; H02G 3/0456; H02G 3/00; H02G 3/0437; H02G 3/0487; H01R 2105/00; H01R 24/84
See application file for complete search history.

(56) References Cited

U.S. PATENT DOCUMENTS

| | | | | |
|---|---|---|---|---|
| 1,873,815 A | * | 8/1932 | Benjamin | H02G 3/0487 138/115 |
| 2,062,752 A | * | 12/1936 | Kindberg | H01R 25/14 439/111 |
| 4,258,515 A | * | 3/1981 | Owen | H02G 3/04 138/104 |
| 4,286,630 A | * | 9/1981 | Happer | F16L 3/26 138/116 |
| 4,644,099 A | * | 2/1987 | Basconi | H01B 7/0823 174/115 |
| 4,874,322 A | * | 10/1989 | Dola | H02G 3/0431 52/239 |
| 4,992,058 A | * | 2/1991 | Tanner | H01R 25/162 439/211 |
| 5,113,036 A | * | 5/1992 | Arroyo | G02B 6/4452 385/100 |
| 5,141,447 A | * | 8/1992 | Poirier | H02G 3/00 439/32 |

(Continued)

*Primary Examiner* — Krystal Robinson
(74) *Attorney, Agent, or Firm* — Getz Balich LLC

(57) ABSTRACT

A track section for a track system is provided that includes an enclosed channel and first and second lateral members. The enclosed channel is defined by a base wall, a cover wall, and first and second lateral side walls, and has an interior cavity. The first and second lateral side walls are disposed on opposite sides of the enclosed channel. The base wall and the cover wall are spaced apart from one another and extend between the first and second lateral side walls. The first lateral member extends outward from the first lateral side wall and the second lateral member extends outward from the second lateral side wall. Each has a ramp flange channel. The track section is a unitary structure with the first and second lateral members being integral with the enclosed channel and has a length between first and second lengthwise ends.

20 Claims, 15 Drawing Sheets

(56) References Cited

U.S. PATENT DOCUMENTS

| | | | |
|---|---|---|---|
| 5,267,367 A * | 12/1993 | Wegmann, Jr. | A62C 33/06 52/220.5 |
| 5,336,097 A * | 8/1994 | Williamson, Jr. | H02G 3/288 439/94 |
| 5,399,813 A * | 3/1995 | McNeill | H01B 7/0823 174/113 AS |
| 5,967,820 A * | 10/1999 | Siegal | H01R 25/162 439/214 |
| 6,323,421 B1 * | 11/2001 | Pawson | H02G 3/0608 52/220.1 |
| 6,350,135 B1 * | 2/2002 | Acklin | H02G 3/128 439/211 |
| 6,448,497 B1 * | 9/2002 | McCracken | H02G 3/383 174/99 R |
| 6,481,036 B1 | 11/2002 | Duvall | |
| 6,492,594 B1 * | 12/2002 | Magyar | H02G 3/0487 174/95 |
| 6,747,212 B1 | 6/2004 | Henry | |
| 6,875,916 B2 | 4/2005 | Winkelbach | |
| 6,878,881 B1 * | 4/2005 | Henry | H02G 9/04 174/101 |
| 7,145,079 B1 | 12/2006 | Henry | |
| 7,201,589 B2 | 4/2007 | Jong | |
| 7,309,836 B2 | 12/2007 | Lubanski | |
| D563,323 S | 3/2008 | Henry | |
| 7,385,139 B2 | 6/2008 | Lubanski | |
| D583,771 S | 12/2008 | Lubanski | |
| 7,531,746 B2 | 5/2009 | Henry | |
| 7,592,547 B2 | 9/2009 | Lubanski | |
| 7,595,450 B2 | 9/2009 | Lubanski | |
| 7,654,841 B2 * | 2/2010 | Arflack | H02G 3/105 439/211 |
| 7,674,980 B2 | 3/2010 | Lubanski | |
| 7,696,433 B2 | 4/2010 | Winkelbach | |
| D619,099 S * | 7/2010 | Ngo | D13/154 |
| 7,810,197 B1 | 10/2010 | Anthony | |
| 7,838,772 B2 | 11/2010 | Lubanski | |
| D630,167 S | 1/2011 | Donowho | |
| 7,893,567 B1 | 2/2011 | Deros | |
| D635,935 S | 4/2011 | Donowho | |
| 7,939,759 B2 * | 5/2011 | Henry | H02G 3/0406 174/101 |
| 7,943,851 B2 | 5/2011 | Lubanski | |
| 8,001,643 B1 | 8/2011 | James | |
| 8,099,813 B2 | 1/2012 | Parker | |
| 8,119,914 B2 | 2/2012 | Lubanski | |
| 8,309,850 B2 | 11/2012 | Henry | |
| D692,837 S | 11/2013 | Knapp | |
| 8,616,921 B2 | 12/2013 | Byrne | |
| 8,791,363 B2 | 7/2014 | Lubanski | |
| D717,248 S | 11/2014 | Coffman | |
| D719,519 S | 12/2014 | Mathena | |
| 9,059,574 B2 | 6/2015 | Coffman | |
| D763,414 S | 8/2016 | Allin | |
| 9,673,601 B2 | 6/2017 | Coffman | |
| 9,685,730 B2 | 6/2017 | Jones | |
| 9,834,927 B2 | 12/2017 | Huff | |
| 9,906,006 B2 | 2/2018 | Handler | |
| D832,216 S | 10/2018 | Tyrrell | |
| D833,395 S | 11/2018 | Tyrrell | |
| 10,153,627 B1 | 12/2018 | Gamble | |
| D843,329 S | 3/2019 | Baldwin | |
| 10,283,952 B2 * | 5/2019 | Dombrowski | H01R 25/145 |
| 10,333,283 B1 * | 6/2019 | Strong | H02G 3/0431 |
| 10,348,072 B2 | 7/2019 | Gaiser | |
| 10,396,534 B2 | 8/2019 | Henry | |
| 10,396,539 B2 | 8/2019 | Henry | |
| 10,622,792 B2 | 4/2020 | Gordon | |
| 10,644,487 B1 | 5/2020 | Strong | |
| 10,686,306 B2 | 6/2020 | Gaiser | |
| 10,862,283 B1 | 12/2020 | Hansen | |
| 10,886,681 B2 | 1/2021 | Alexander | |
| D911,288 S | 2/2021 | Jensen | |
| 10,950,995 B2 | 3/2021 | Strong | |
| 10,958,049 B2 | 3/2021 | Strong | |
| 10,998,702 B2 | 5/2021 | Strong | |
| 2004/0222008 A1 * | 11/2004 | Hyde | H02G 3/00 174/72 A |
| 2005/0011657 A1 * | 1/2005 | Johnston | H02G 3/0431 174/502 |
| 2013/0146324 A1 * | 6/2013 | Byrne | H02G 3/0437 174/58 |
| 2019/0229506 A1 | 7/2019 | Henry | |
| 2020/0091693 A1 | 3/2020 | Henry | |
| 2020/0409011 A1 | 12/2020 | Dupuis | |

\* cited by examiner

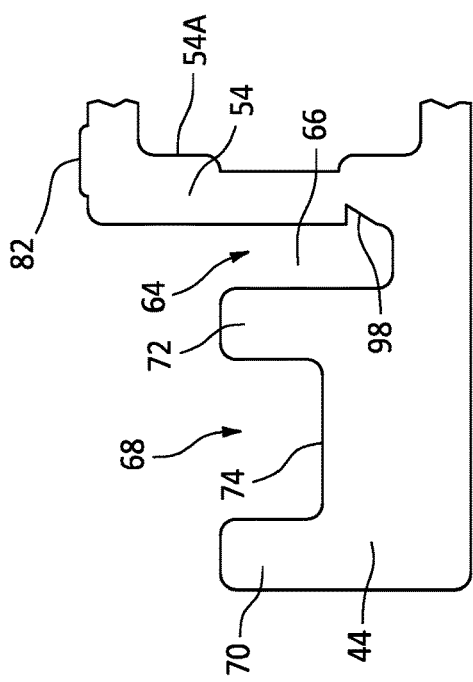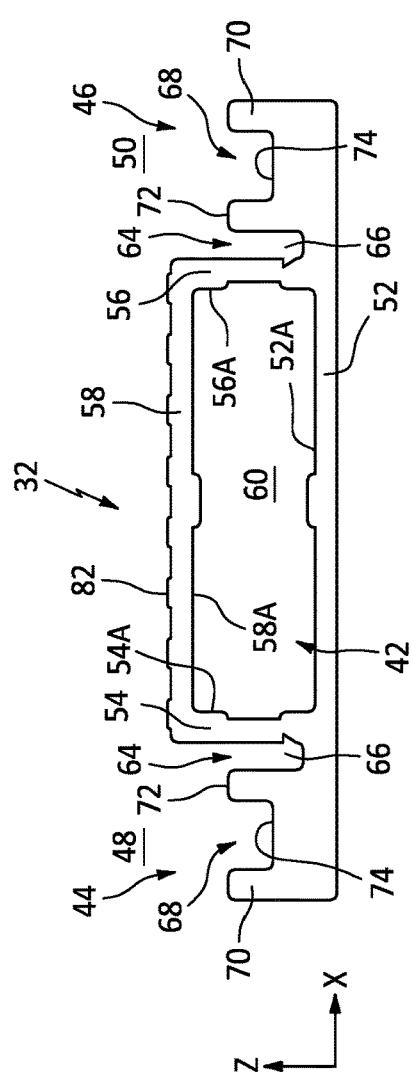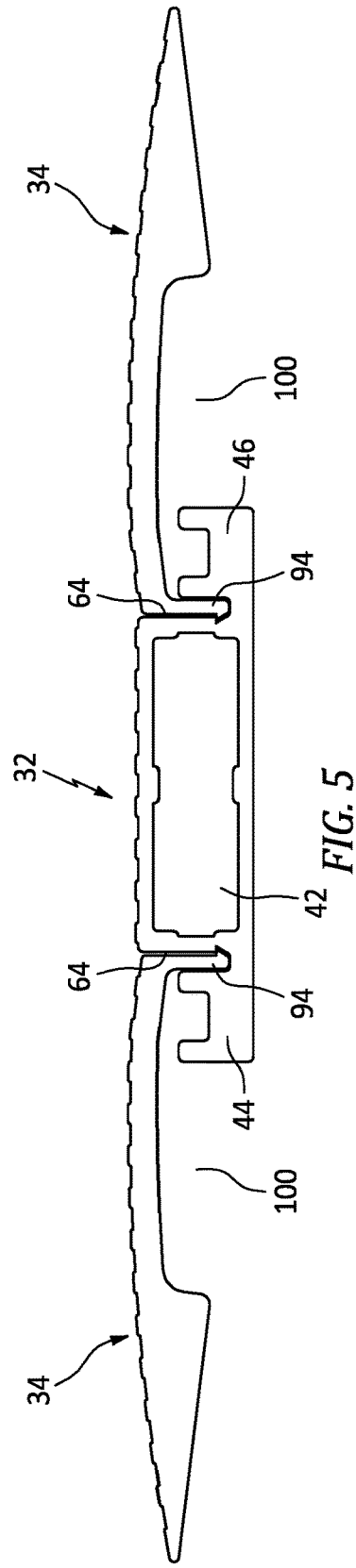

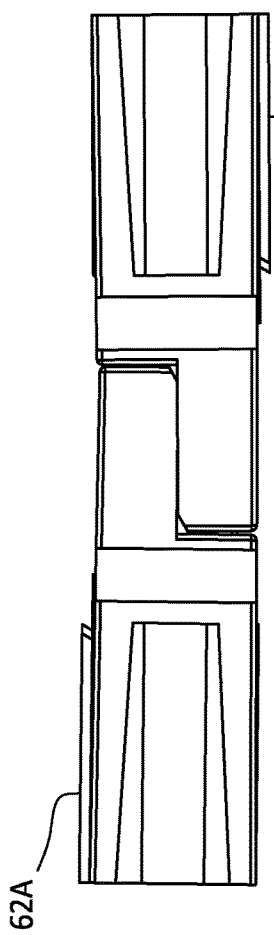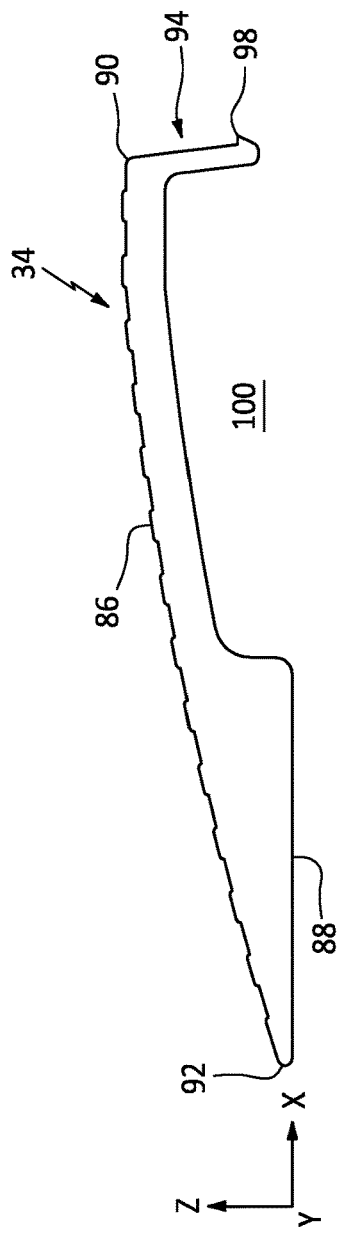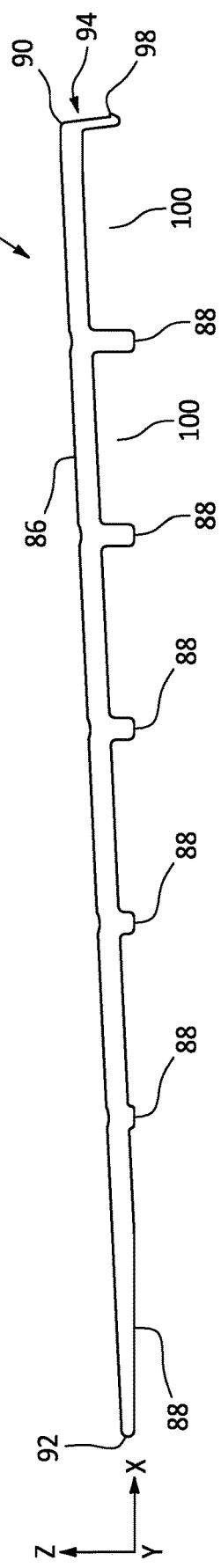

POWER AND/OR DATA CONNECTIVITY TRACK SYSTEM

BACKGROUND OF THE DISCLOSURE

1. Technical Field

The present invention relates to floor track systems for providing power and communication capabilities.

2. Background Information

Track systems are available that permit the routing of electrical power lines and/or communications cables along a floor. Typically, a track system accepts power lines/cables from a source point and routes those cables to one or more end points; e.g., desk stations, equipment stations, etc. Many of the currently available track systems are limited in the manner in which they can be implemented. For example, some track systems can only be implemented in a linear manner. Some currently available track systems do not permit cable cross-over. Some currently available track systems have a track height that can present a tripping hazard. Some currently available track systems can only be used in an exposed configuration (e.g., visible on a floor) or under a carpet, but not both. Finally, some existing track systems are relatively complex and require substantial time and effort to assemble.

What is needed is a track system that is an improvement over currently available track systems.

SUMMARY

According to an aspect of the present disclosure, a track section for a track system is provided that includes an enclosed channel, a first lateral member and a second lateral member. The enclosed channel is defined by a base wall, a cover wall, a first lateral side wall, and a second lateral side wall. The enclosed channel has an interior cavity. The first lateral side wall and the second lateral side wall are disposed on opposite sides of the enclosed channel. The base wall and the cover wall are spaced apart from one another and extend between the first lateral side wall and the second lateral side wall. The first lateral member extends laterally outward from the first lateral side wall and has a first ramp flange channel. The second lateral member extends laterally outward from the second lateral side wall and has a second ramp flange channel. The track section is a unitary structure with the first lateral member and the second lateral member being integral with the enclosed channel and has a length that extends between a first lengthwise end and an opposite second lengthwise end.

In any of the aspects or embodiments described above and herein, the base wall, cover wall, first lateral side wall, and second lateral side wall each have a respective interior surface, and the interior surfaces may define the interior cavity of the enclosed channel. The interior cavity may be configured to mate with a plurality of electrical connectors.

In any of the aspects or embodiments described above and herein, the interior cavity configuration may mate with four side by side electrical connectors to receive and position the electrical connectors.

In any of the aspects or embodiments described above and herein, each of the electrical connectors may be an Anderson Powerpole® type connector.

In any of the aspects or embodiments described above and herein, the track section may further include a first arrangement of electrical connectors disposed in the interior cavity at the first lengthwise end, and a second arrangement of electrical connectors disposed in the interior cavity at the second lengthwise end, and a plurality of wires extending within the enclosed channel in communication with both the first arrangement of electrical connectors and the second arrangement of electrical connectors.

In any of the aspects or embodiments described above and herein, the interior cavity may be configured to mate with the first arrangement of electrical connectors disposed at the first lengthwise end and with the second arrangement of electrical connectors disposed at the second lengthwise end.

In any of the aspects or embodiments described above and herein, the first lengthwise end of the track section may be configured to be an input end, and the second lengthwise end may be configured to be an output end. The input end and the output end are configured to mate with one another, thereby permitting the output end of a first track section to mate with the input end of a second track section, thereby electrically connecting the first track section and the second track section.

In any of the aspects or embodiments described above and herein, the unitary structure of the track section that includes the first lateral member, the second lateral member, and the enclosed channel may be initially formed with a cross-sectional geometry in a width versus height plane that is uniform in a lengthwise direction.

In any of the aspects or embodiments described above and herein, the track section may be initially formed by an extrusion process.

According to another aspect of the present disclosure, a track system is provided that includes at least one track section, at least one second track section ramp, and at least first track section ramp. The at least one track section includes an enclosed channel, a first lateral member, and a second lateral member. The enclosed channel is defined by a base wall, a cover wall, a first lateral side wall, and a second lateral side wall. The enclosed channel has an interior cavity. The first lateral side wall and the second lateral side wall are disposed on opposite sides of the enclosed channel. The base wall and the cover wall are spaced apart from one another and extend between the first lateral side wall and the second lateral side wall. The first lateral member extends laterally outward from the first lateral side wall and has a first ramp flange channel. The second lateral member extends laterally outward from the second lateral side wall and has a second ramp flange channel. The track section is a unitary structure with the first lateral member and the second lateral member being integral with the enclosed channel and has a length that extends between a first lengthwise end and an opposite second lengthwise end. The at least one first track section ramp is engaged with the first lateral member of a respective track section. The at least one second track section ramp is engaged with the second lateral member of a respective track section. The at least first track section ramp and the at least one second track section ramp each have a triangular-like geometry that extends lengthwise.

In any of the aspects or embodiments described above and herein, the interior cavity may be configured to mate with the first arrangement of electrical connectors disposed at the first lengthwise end and with the second arrangement of electrical connectors disposed at the second lengthwise end.

In any of the aspects or embodiments described above and herein, the at least one track section may include a first track section and a second track section, and the first lengthwise end of the first track section may be configured to be an input end, and the second lengthwise end of the second track section may be configured to be an output end, and the input end and the output end may be configured to mate with one another, thereby permitting the input end of the first track section to mate with the output end of the second track section.

In any of the aspects or embodiments described above and herein, the track system may include at least one hub having an input port and at least one output port. The input port may be configured to mate with and electrically connect to a respective track section. The at least one output port may be configured to mate with and electrically connect to a power box having at least one electrical connection port.

In any of the aspects or embodiments described above and herein, the hub may include a printed circuit board that electrically connects the input port and the at least one output port.

In any of the aspects or embodiments described above and herein, the track system may include at least one hub having an input port and at least one output port. The input port may be configured to mate with and electrically connect to the second arrangement of electrical connectors at the output end of a first respective track section. The at least one output port may be configured to mate with and electrically connect to the first arrangement of electrical connectors at the output end of a second respective track section.

In any of the aspects or embodiments described above and herein, the hub may include a connection box output port configured to mate with and electrically connect to a power box having at least one electrical connection port, and the connection box output port may be electrically connected to the printed circuit board.

In any of the aspects or embodiments described above and herein, the hub may be configured to permit a cable extending out from one of the first or second track section ramps of the first respective track section to pass through the hub and into the first or second track section ramps of the second respective track section.

In any of the aspects or embodiments described above and herein, the hub may include a cover plate, and the cable passes through the hub beneath the cover plate.

In any of the aspects or embodiments described above and herein, the hub may be configured to connect to a connection box having at least one communication line port.

In any of the aspects or embodiments described above and herein, the first ramp flange channel may include a first tab channel that extends the length of the track section. The first track section ramp may include a first flange having a first tab that extends the length of the at least one first track section ramp. The first ramp flange channel, first tab channel, first flange, and first tab may be configured such that the first flange is receivable within the first ramp flange channel, and rotation of the first flange relative to the first ramp flange channel received therein causes the first tab to engage with the first tab channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 3 is a cross-sectional view of a track section in a width (X-axis) versus height (Z-axis) plane.

FIG. 4 is an enlarged portion of the track section cross-section shown in FIG. 3.

FIG. 5 is a diagrammatic end view of a track section with a pair of track section ramps.

FIG. 13 is a diagrammatic side view of the coupled groups of connectors shown in FIG. 12.

FIG. 15 is a diagrammatic end view of a track section ramp embodiment.

FIG. 16 is a diagrammatic end view of a track section ramp embodiment.

DETAILED DESCRIPTION

Figure 1:
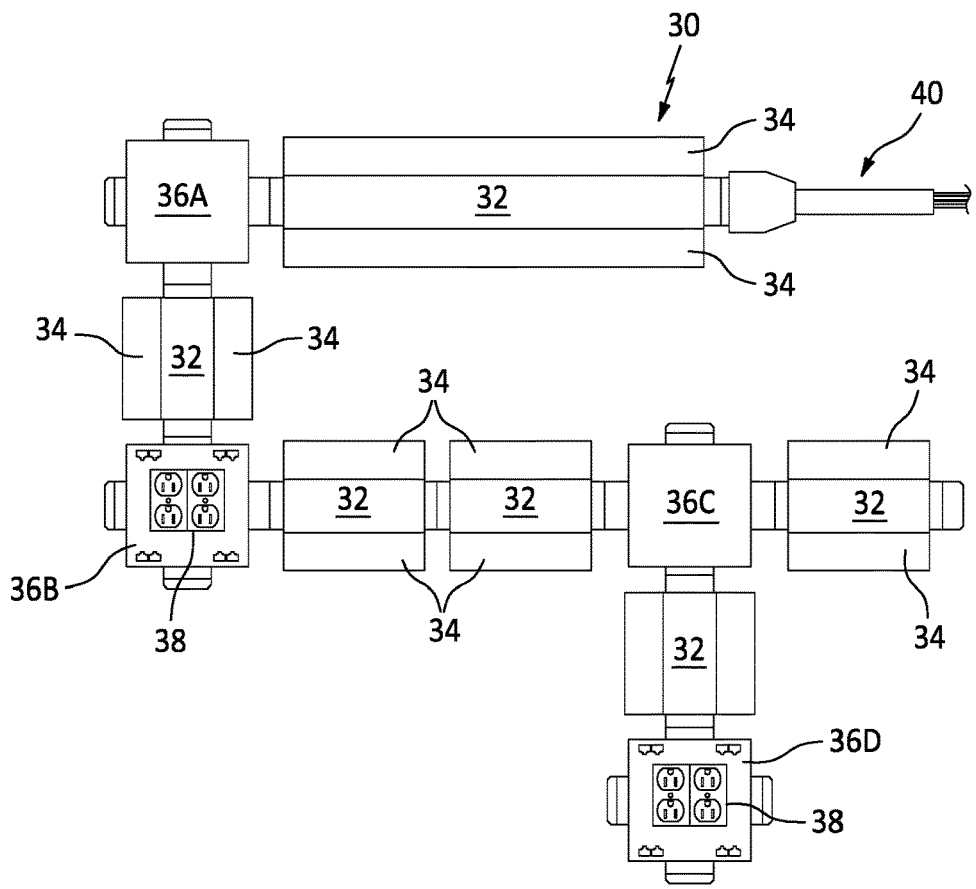
FIG. 1 is a diagrammatic illustration of a present disclosure track system.

Referring to FIG. 1, workspace utilization is very often stymied by a lack of power and/or data lines in particular locations. This is particularly true when an existing space is being rearranged or repurposed. The present disclosure provides a novel solution in the form of a track system 30 (also referred to herein as the "KG track system 30") that can provide power, communications, and/or data connectivity virtually anywhere on a workspace floor. The present track system 30 includes components such as track sections 32, track section ramps 34, hubs 36, power boxes 38, system infeed components 40, and the like that may be configured in a multitude of ways and combinations to satisfy the user's needs. The track system 30 shown in FIG. 1 diagrammatically illustrates a non-limiting example of the present disclosure track system 30.

Figure 2:
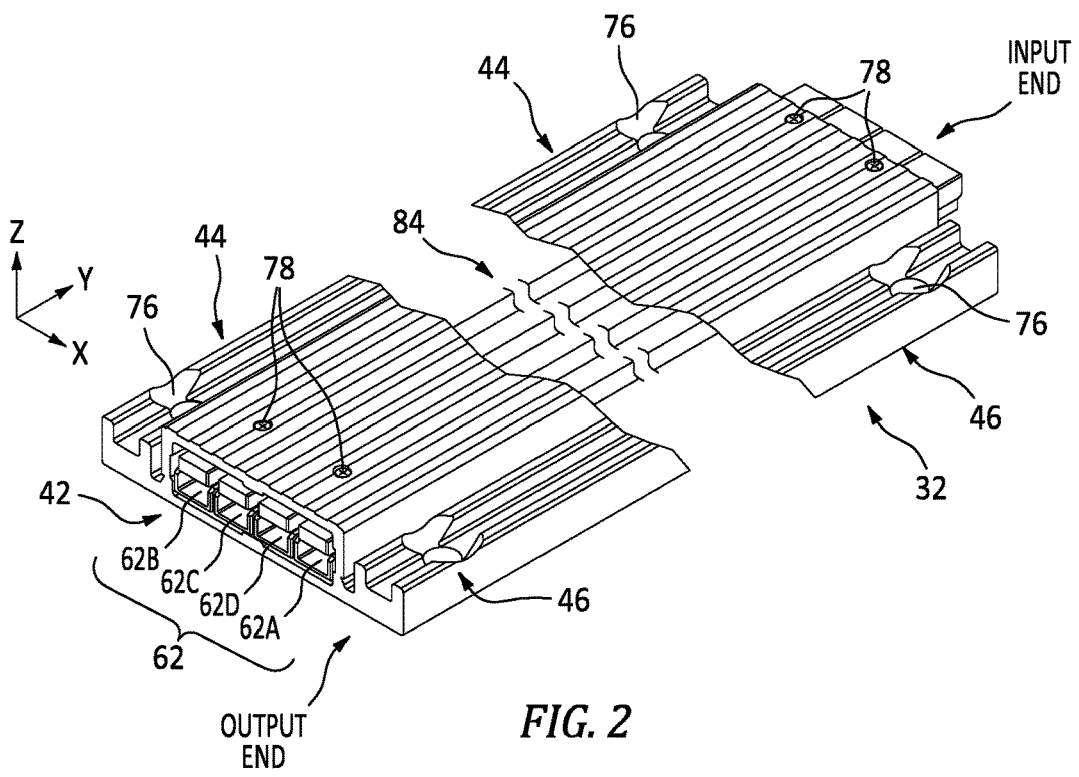
FIG. 2 is a diagrammatic perspective view of a track section.

Referring to FIGS. 2 and 3, each track section 32 may be described as having a height (Z-axis), a width (X-axis), and a length (Y-axis). The track section 32 has a cross-sectional geometry in the width versus height plane (X-Z plane). In some present disclosure system 30 embodiments, track sections 32 may be available in a variety of different lengths; e.g., in one foot increments up to a maximum length and in custom lengths.

Each track section 32 includes an enclosed channel 42, a first lateral member 44, and a second lateral member 46. The first lateral member 44 is attached to the enclosed channel 42 and extends laterally outwardly from the enclosed channel 42 on a first lateral side 48. The second lateral member 46 is attached to the enclosed channel 42 and extends laterally outwardly from the enclosed channel 42 on a second lateral side 50. The first lateral side 48 is opposite the second lateral side 50. The enclosed channel 42 is disposed between the first and second lateral members 44, 46 in the cross-sectional plane (i.e., the X-Z plane). The enclosed channel 42 and the first and second lateral members 44, 46 all extend along the lengthwise axis (e.g., Y-axis) of the track section 32. The aforesaid cross-sectional geometry (i.e., the X-Z plane) that extends lengthwise (i.e., along the Y-axis) permits a track section 32 to be formed as a unitary structure with the first lateral member 44, the second lateral member 46, and the enclosed channel 42 being integrally formed with one another; i.e., no fasteners or binding agents used to attach the aforesaid elements. The uniformity of the cross-sectional geometry in the lengthwise direction provides several benefits. For example, a unitary track section 32 having a uniform cross-sectional geometry extending in the lengthwise direction facilitates manufacturing. Such a configuration may be formed by a variety of different processes including but not limited to casting and extrusion. As another example, a unitary track section 32 facilitates the production of modular sections and the implementation of a track system. As yet another example, a unitary track section avoids issues associated with track element tolerances and deformation that inhibit track assembly. These and other benefits will be clear from the description provided herein.

The enclosed channel 42 is defined by a base wall portion 52, a first lateral wall portion 54, a second lateral wall portion 56, and a cover wall portion 58. The enclosed channel 42 includes an interior cavity 60 that is defined by the interior surfaces 52A, 54A, 56A, 58A of the base wall portion 52, the first and second lateral wall portions 54, 56, and the cover wall portion 58 respectively. As will be detailed below, in some embodiments one or more of the aforesaid interior surfaces 52A, 54A, 56A, 58A may be configured to facilitate mounting and retention of electrical connectors 62; e.g., for a ground wire (green), a neutral wire (white), a first hot wire (red), and a second hot wire (black). The uniformity of the cross-sectional geometry in the lengthwise direction provides a particular benefit when the interior surfaces 52A, 54A, 56A, 58A are configured to facilitate mounting and retention of electrical connectors; e.g., a track section may be cut to an arbitrary/custom length and the cut end cross-sectional geometry will be the same as that of the original end and therefore capable of mounting and retaining electrical connectors.

The first and second lateral members 44, 46 each include a ramp flange channel 64 with an interior cavity 66. The ramp flange channel 64 has an open configuration that permits access to the interior cavity 66; e.g., the open configuration permits receipt of a ramp flange as will be described in greater detail below.

In some embodiments, the first and/or second lateral members 44, 46 may include a secondary channel 68. In the embodiment shown in FIGS. 3 and 4, both lateral members 44, 46 include a secondary channel 68 that has an interior cavity that is at least partially defined by a first partition wall 70, a second partition wall 72, and a base wall 74. The first and second partition walls 70, 72 may extend substantially perpendicular to the base wall 74 to form the interior of the secondary channel 68. The interior cavity of the secondary channel 68 is open between the first and second partition walls 70, 72.

In the track section 32 embodiment shown in FIG. 3, the first and second lateral members 44, 46 are left and right hand versions (e.g., "mirrored" versions) of one another. The present disclosure is not limited to a track section 32 having mirrored lateral members 44, 46. For example, in some embodiments the first and second lateral members 44, 46 may be differently configured; e.g., the first lateral member 44 may have only a ramp flange channel 64, and the second lateral member 46 may have a ramp flange channel 64 and a secondary channel 68, and so on.

As stated above, present disclosure track section 32 embodiments have a cross-section configuration (e.g., in the X-Z plane) that extends uniformly in a lengthwise direction (i.e., along the Y-axis). In some embodiments, a track section 32 with lengthwise extending uniformity may be subsequently modified for certain applications. For example, the track section 32 shown in FIG. 2 illustrates a unitary track section 32 having an enclosed channel 42 and first and second lateral members 44, 46 that extend lengthwise uniformly. This track section 32 embodiment also includes some number of fastener apertures 76 disposed within the first and second lateral members 44, 46. These fastener apertures are 76 configured to receive fasteners (not shown) that can be used to secure the respective track section 32 to the flooring or other substrate. As another example, a track section 32 embodiment may also include apertures 78 for securing elements within the enclosed channel 42; e.g., the track section 32 embodiments shown in FIGS. 2 and 6-9 include apertures 78 for receiving fasteners (e.g., pins 80) that operate to hold wire connectors 62 adjacent the distal ends of the track section 32. These modifications are non-limiting examples of modifications that may be made to an otherwise uniform track section 32 configuration.

The exterior surface 82 of the cover wall portion 58 of the enclosed channel 42 may include a variety of different surface configurations and the present disclosure is not limited to any particular surface configuration. For example, in the track section 32 embodiment shown in FIGS. 2-9 the exterior surface 82 of the cover wall portion 58 includes lengthwise extending grooves.

Track sections 32 may be configured as pre-wired modular units with power wires 84 extending between the lengthwise ends of the respective track section 32. Track sections 32 configured as pre-wired units facilitate the present system 30 being a "plug together" modular system 30 that greatly facilitates design and installation. At each lengthwise end of a track section 32, each power wire 84 may terminate at a connector 62 for that particular wire 84, or at a connector configured to connect a plurality of wires 84. The connector(s) 62 at one end of a track section 32 may be disposed in a first configuration; e.g., in an input mode, and that track section 32 lengthwise end may be referred to as the "input end". The connector(s) 62 at the opposite lengthwise end of the same track section 32 may be disposed in a second configuration; e.g., in an output mode, and that track section 32 lengthwise end may be referred to as the "output end". With this configuration, the output end of a first track section 32 may be coupled with the input end of a second track section 32; e.g., male and female coupling. Once the connectors from the first track section 32 and the second track section 32 have been coupled, the respective power wires 84 within the track sections 32 are in signal communication with one another; e.g., electrically connected. The ability to plug track sections 32 directly together (no intermediary device required) provides a significant benefit. These pre-wired track sections 32 can be produced in a variety of different lengths (e.g., in one foot increments up to a maximum length or in customized lengths). The aforesaid pre-wired track sections 32 can then simply be plugged together to produce the desired track system 30 configuration. As will be detailed herein, the same connectors 62 used in track sections 32 may be used in other system 30 components such as hubs 36, and the like to facilitate system component connectibility and use.

Figure 6:
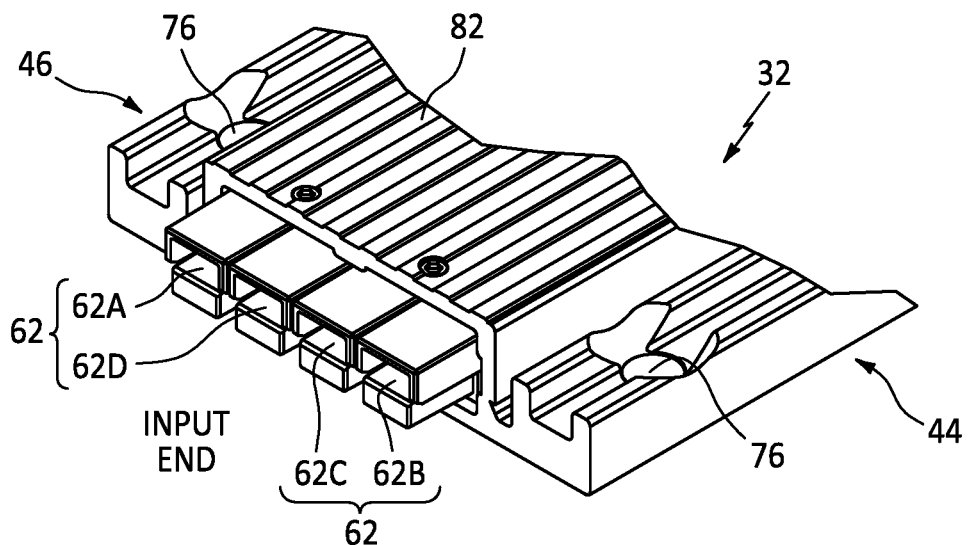
FIG. 6 is an enlarged partial view of the input end of a track section.
Figure 7:
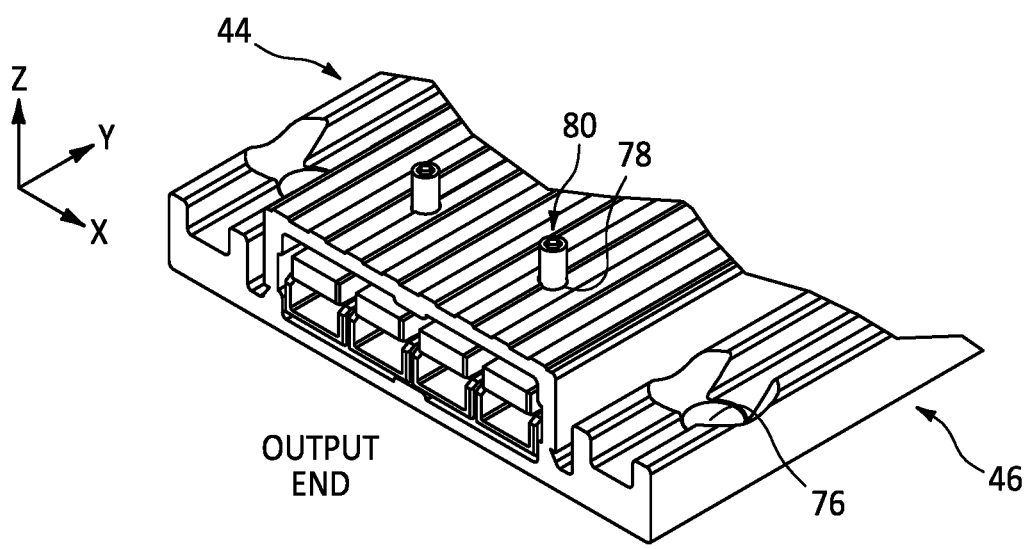
FIG. 7 is an enlarged partial view of the output end of a track section.
Figure 8:
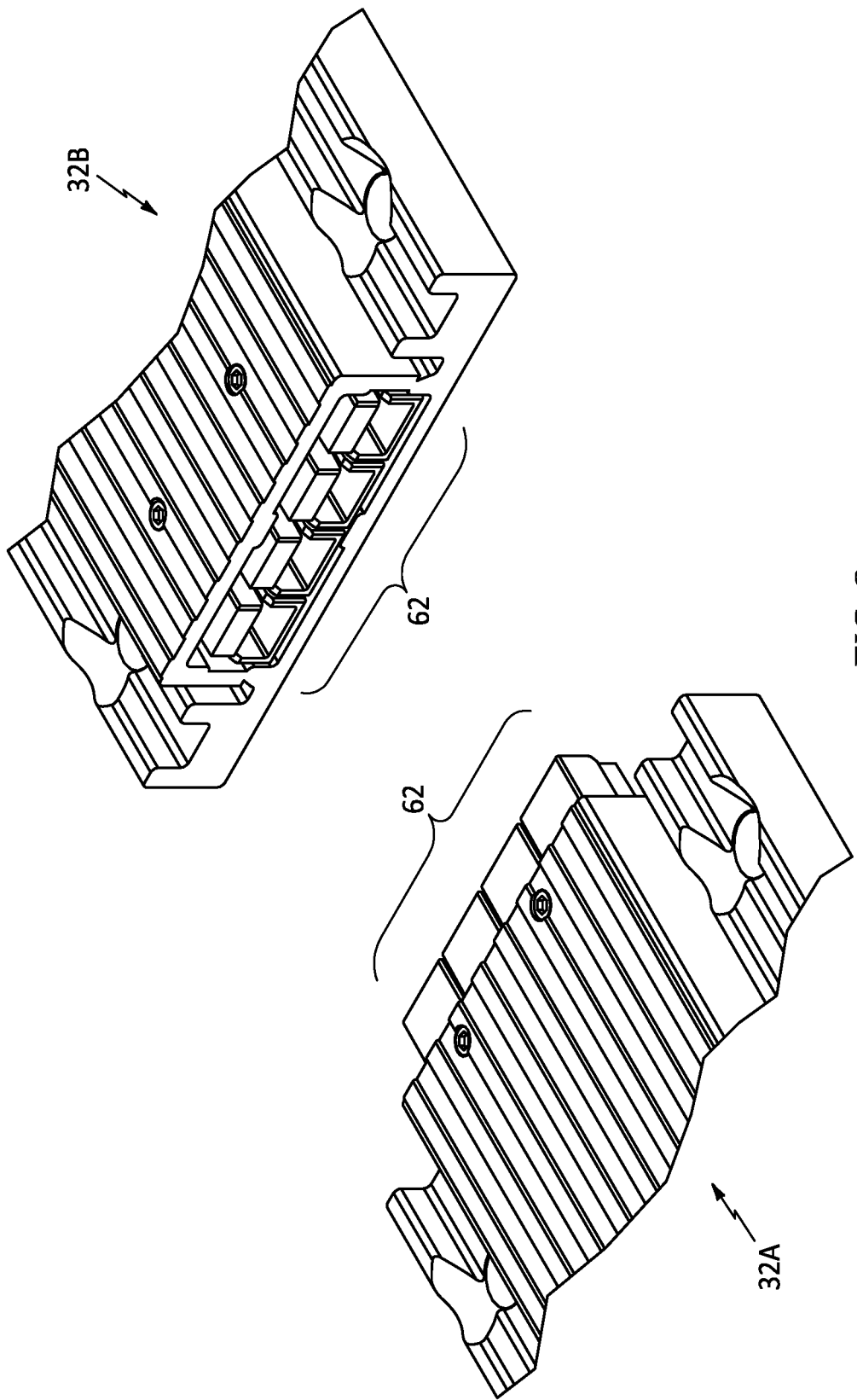
FIG. 8 illustrates mating track sections (i.e., input end/output end) spaced apart from one another.
Figure 9:
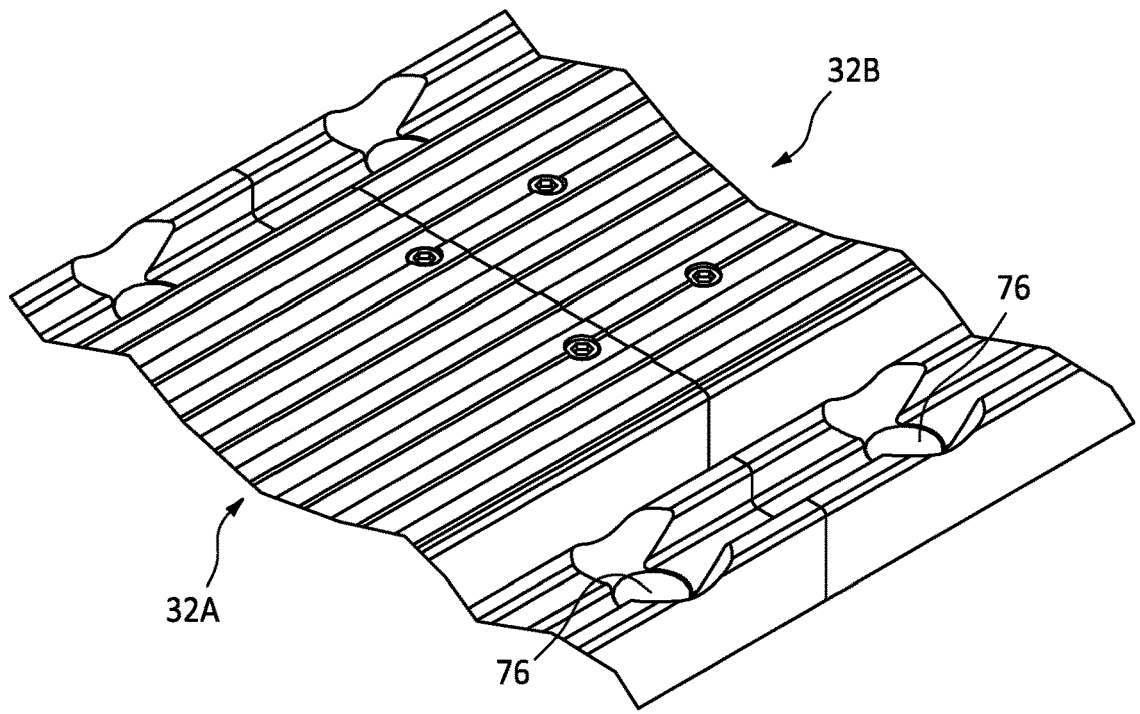
FIG. 9 illustrates two track sections coupled with one another.
Figure 10:
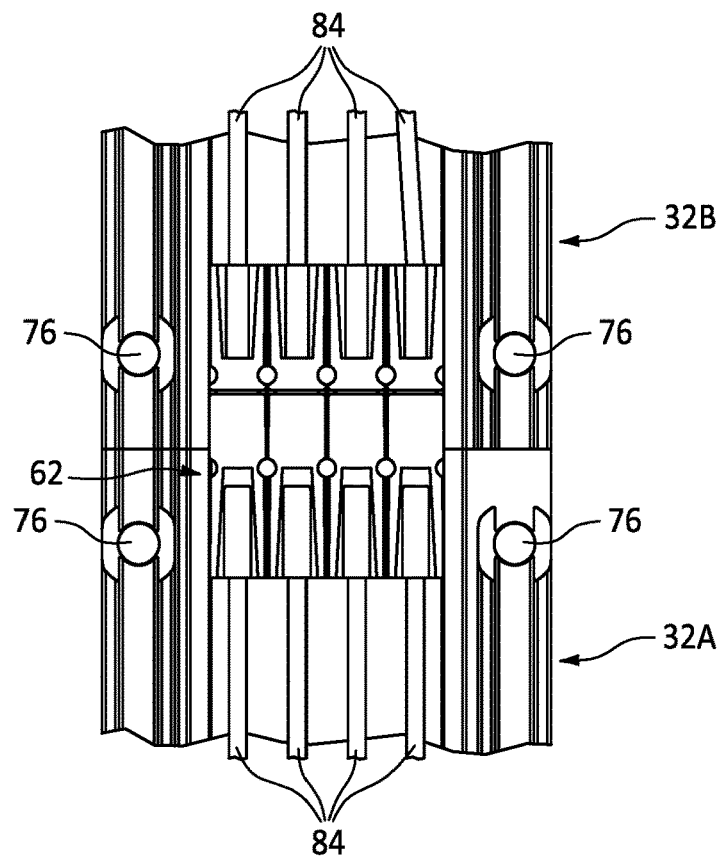
FIG. 10 is a sectional planar view of mating track sections coupled with one another, with the cover portion of the enclosed channels removed.
Figure 11:
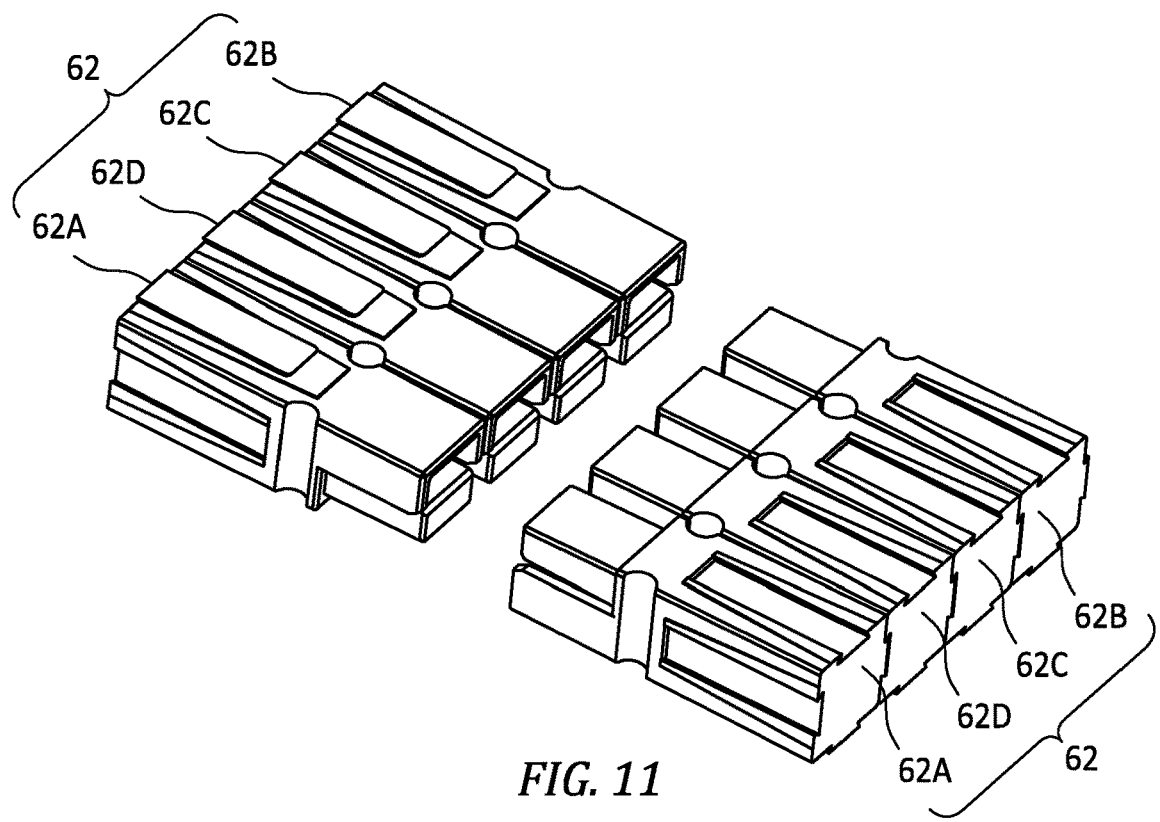
FIG. 11 is a diagrammatic perspective of two groups of four (4) connectors side by side, with the mating connectors from each group separated from the mating connectors of the opposite group.
Figure 12:
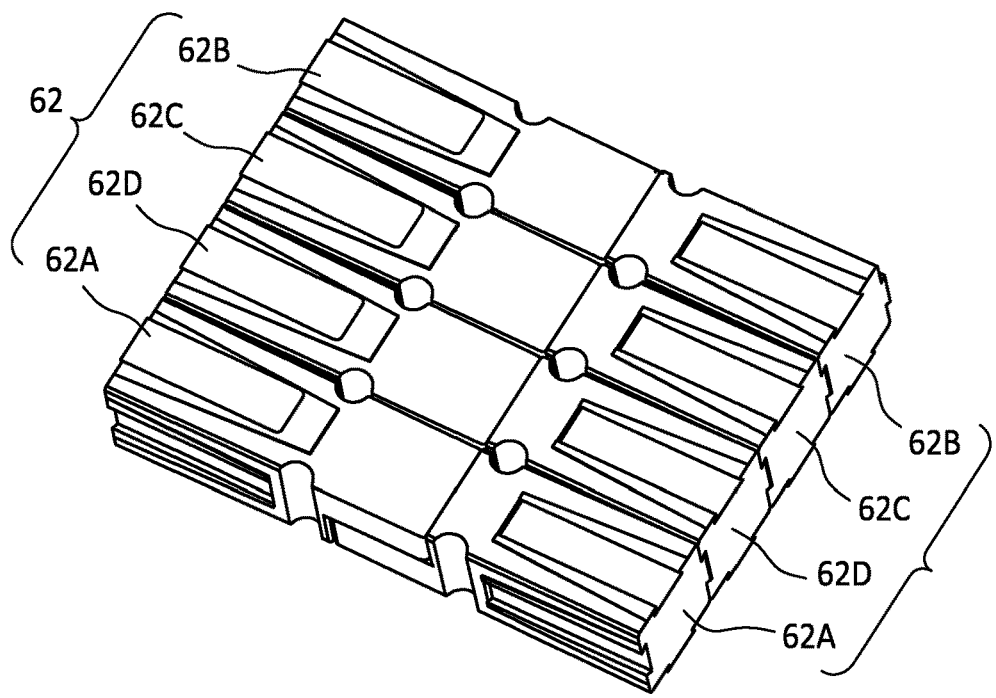
FIG. 12 is a diagrammatic perspective of the two groups of connectors shown in FIG. 11, with the connectors from each group connected to the connectors of the opposite group.

An example of an acceptable electrical connector 62 that may be used in the present disclosure system is an Anderson Powerpole® type connector produced by Anderson Power Products, Inc. of Sterling Mass., USA. Embodiments of the present disclosure track sections 32 have an enclosed channel 42 interior cavity 60 that is configured to mount and retain a plurality of Anderson Powerpole® type connectors. For example, the enclosed channel interior cavity 60 shown in FIG. 3 includes cavities in the interior surfaces 54A, 56A of the first and second lateral wall portions 54, 56, and outward projections on the interior surface 52A, 58A of the base wall 52 and cover wall 58. These cavities and projections are configured to facilitate mounting and retention of an arrangement of Anderson Powerpole® type connectors; e.g., four (4) Anderson Powerpole® connectors disposed side by side (i.e., ground 62A, neutral 62B, first hot 62C, second hot 62D—as shown in FIG. 6). In addition, the track sections 32 may also include apertures 78 for receiving pins 80 that also help retain the connectors 62 within the enclosed channel 42, and more specifically in either an input configuration (e.g., see FIG. 6) or an output configuration (e.g., see FIG. 7). The Anderson Powerpole® connectors are configured to permit coupling with other Anderson Powerpole® connectors; e.g., Anderson Powerpole® connectors in a first orientation may be coupled with Anderson Powerpole® connectors disposed in a second configuration (180° flipped). Hence, first and second track sections 32 may be coupled via the Anderson Powerpole® connectors. FIG. 8 illustrates mating track sections 32A (input end) and 32B (output end) spaced apart from one another. FIG. 9 illustrates mating track sections 32A, 32B coupled with one another. FIG. 10 is a sectional view (cover wall portion 58 of the enclosed channel 42 removed) of the mating track sections 32A, 32B coupled with one another to illustrate the coupled connectors. FIG. 11 is a diagrammatic perspective of two groups of four (4) Anderson Powerpole® type connectors 62A, 62B, 62C, 62D side by side, with the mating connectors from each group separated from the mating connectors of the opposite group. FIG. 12 is a diagrammatic perspective of the two groups of Anderson Powerpole® type connectors 62A, 62B, 62C, 62D shown in FIG. 11, with the mating connectors from each group connected to the mating connectors of the opposite group. FIG. 13 is a diagrammatic side view showing a pair 62A, 62A of the coupled Anderson Powerpole® connectors shown in FIG. 12. As can be seen in FIG. 13, the Anderson Powerpole® connectors are configured such that a pair of identical Anderson Powerpole® connectors can be used as a mating pair by rotating a first connector one hundred and eighty degrees (180°) from the second connector. The aforesaid Anderson Powerpole® type connectors are an example of a type of wire connector that may be used, and the present disclosure is not limited thereto.

Figure 14:
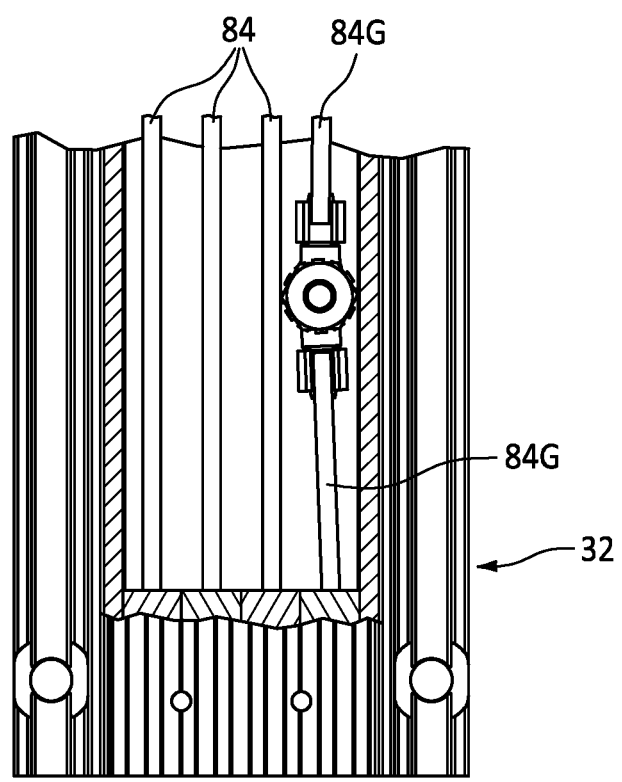
FIG. 14 is a diagrammatic view of a sectioned track section illustrating a ground wire attached to the track section.
Figure 17A:
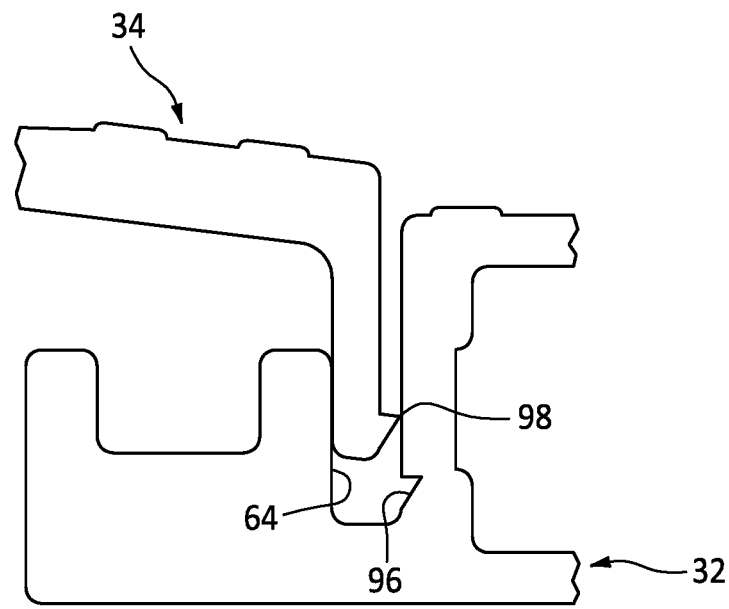
FIG. 17A is a diagrammatic representation of a portion of a track section ramp flange received within a track section channel without interference.
Figure 17B:
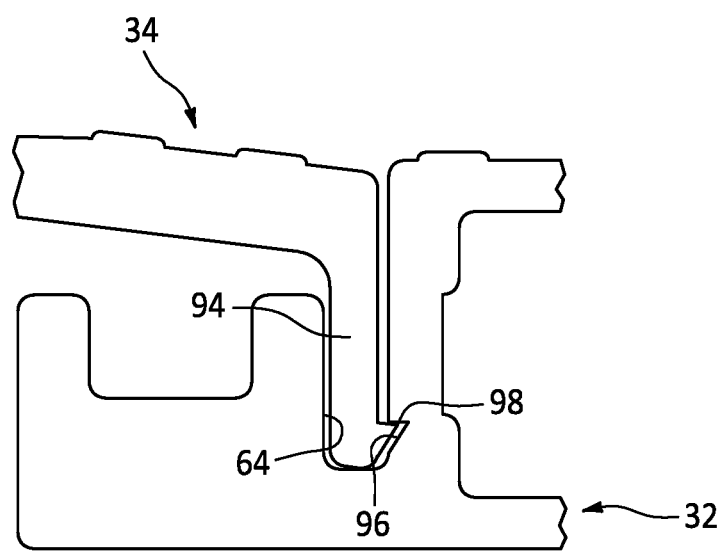
FIG. 17B is a diagrammatic representation of the portion of a track section ramp flange received within a track section channel as shown in FIG. 17A and rotated.

Referring to FIG. 14, in some embodiments a track section 32 (including track sections 32 configured as pre-wired modular units) may be configured to permit a power wire 84G acting as a ground to be grounded to the track section 32. For example, as shown in FIG. 14 the track section 32 may include a mechanical fastener (e.g., a screw) engaged with the track section and ring terminals attached to the ends of a ground power wire 84G. A ground wire 84G may be electrically connected to a track section 32 in a variety of different ways (e.g., ultrasonic weld, mechanical clip, etc.) and the present disclosure is not therefore limited to any electrical connection means.

In some embodiments, the connectors 62 that are used in the present system 30 to connect system 30 components (e.g., track section 32 to track section 32, track section 32 to hub 36, hub 36 to power box 38, etc.) may be configured as multiple wire connections with one of the aforesaid connections being a "first-mate last-break" ground connection. For example, as the plurality of mating connectors 62 are drawn toward one another for engagement, the mating ground connectors within the plurality of connectors 62 are configured to be the first to electrically connect. Similarly, when the plurality of mating connectors 62 are disengaging with one another (e.g., as two track sections 32 are disconnecting), the mating ground connectors within the plurality of connectors 62 are configured to be the last to electrically disconnect.

Referring to FIGS. 15 and 16, the KG track system 30 includes a plurality of track section ramp 34 embodiments that may be used in certain applications. Each track section ramp 34 may be described as having a height (Z-axis), a width (X-axis), and a length (Y-axis); i.e., the same orthogonal axis orientation as a track section 32. The track section ramp 34 has a cross-sectional geometry in the width versus height plane (X-Z plane) that extends uniformly in a lengthwise direction (i.e., along the Y-axis). As indicated above, a unitary component (in this case a track section ramp 34) having a uniform cross-sectional geometry extending in the lengthwise direction facilitates manufacturing and may be manufactured using processes such as casting or extrusion. In FIGS. 15 and 16, the X-Z plane cross-sectional of the respective track section ramp 34 embodiments are shown, and the length would be perpendicular thereto. Like the track section embodiments described above, in some embodiments a track section ramp 34 may be modified to include some number of fastener apertures and the like. The fastener apertures may be configured to receive fasteners that can be used to secure the respective track section ramp 34 to the flooring or other substrate.

Track section ramp 34 embodiments include an upper exterior surface 86 and a base exterior surface 88. The upper exterior surface 86 extends between an interior edge 90 and an exterior edge 92. The base exterior surface 88 may be continuous or may include one or more portions extending less than the entire span of the base. A portion of the base exterior surface 88 may intersect with the upper exterior surface 86 at the exterior edge 92 (e.g., see FIGS. 15 and 16). The cross-sectional geometry of each track section ramp 34 is generally triangular; e.g., with the upper exterior surface 86 generally forming the hypotenuse of the triangle. The aforesaid description of a track section ramp 34 as being "generally triangular" should not be construed in a limited manner. For example, the upper exterior surface 86 may generally extend in a planar manner or in a non-planar manner (e.g., it may be curved or otherwise arcuate).

The exterior surface 86 of a track section ramp 34 may include a variety of different surface configurations and the present disclosure is not limited to any particular surface configuration. For example, the track section ramp 34 embodiment shown in FIG. 15 has an upper exterior surface 86 that includes lengthwise extending grooves.

Referring to FIGS. 3, 4 and 15-17B, in some embodiments a track section ramp 34 may be configured to be coupled with a track section 32 using mating male and female components. Track section ramp 34 embodiments may include a flange 94 (male component) that is configured to be received within a flange channel (female component; e.g., see FIGS. 3 and 4: flange channel 64) of a track section 32. In this embodiment, the flange 94 and the flange channel 64 are configured such that the flange 94 may be inserted into the flange channel 64 without any interference with the flange channel 64; i.e., a clearance fit. The flange channel 64 includes a lengthwise extending tab channel 96 disposed in an inner surface of the flange channel 64 and the flange 94 includes an outwardly extending tab 98 configured to be received within the tab channel 96. Once a sufficient portion of the flange 94 is received within the flange channel 64, the track section ramp 34 may be rotated (e.g., clockwise or counterclockwise relative to the track section 32). After an appropriate amount of rotation, the tab 98 extending outwardly from the flange 94 is at least partially received within the tab channel 96. As stated above, the track section ramp 34 may include fastener apertures for receiving fasteners that can be used to secure the respective track section ramp 34 to the flooring.

As indicated above, embodiments of the track section 32 and ramps 34 may each be configured with a cross-sectional geometry in the width versus height plane (X-Z plane) that extends uniformly in a lengthwise direction (i.e., along the Y-axis). The present disclosure track system 30 is not limited to any particular component material, unless specifically noted herein. For example, an aluminum alloy or a polymeric material may be used, provided the aforesaid material possesses the mechanical strength attributes required for the application at hand. An extruded configuration of a track section 32 or a track section ramp 34 is an example of a unitary structure with the first lateral member 44, the second lateral member 46, and the enclosed channel 42 being integrally formed with one another; i.e., all formed at the same time with the same material. The present disclosure track system 30 components are not limited to any particular material unless otherwise indicated herein.

As will be described herein, some embodiments of the present disclosure track system 30 may be configured for use "on the floor" ("OTF") while other embodiments may be configured for use "under the carpet" ("UTC"). An OTF application refers to an application wherein the track sections 32 are configured to be disposed on a floor surface (e.g., a hardwood floor, a tile floor, a concrete floor, etc.) and are exposed. A UTC application refers to an application wherein the track sections 32 are configured to be disposed beneath a substrate (e.g., carpeting, rug, etc.) and therefore are not generally exposed. Certain track system 30 components (e.g., hubs 36, connectivity/power boxes 38, etc.) may, however, be exposed in UTC applications. The track section ramp 34 embodiment shown in FIG. 15 is an example of a track section ramp 34 configured for an OTF application (often a steeper angle ramp 34). The track section ramp 34 embodiment shown in FIG. 16 is an example of a track section ramp 34 configured for an UTC application (often a shallower angle ramp 34). Track section ramp 34 embodiments may also be configured to at least partially define one or more channels 100 formed beneath the upper exterior surface 86 and the floor surface that is in contact with the ramp base exterior surface 88 when the ramp 34 is assembled with a track section 32. These channels 100 may be configured to receive one or more cables, optical fibers, data communication lines, electrical wiring, or the like.

Embodiments of the present track system 30 include the use of one or more hubs 36 to facilitate track system 20 construction, to provide electrical connectivity between system 20 components, to provide protected routing of cables/lines 102 and the like between track sections 32, and to provide connectivity with various different types of power boxes 38, or other boxes configured for communication lines, video lines, or low voltage lines as will be described below. In the diagrammatic system 30 depiction shown in FIG. 1, the system 30 is shown as including four separate hubs 36A, 36B, 36C, 36D. A first hub 36A is used to change the direction of the track system 30 by ninety degrees (90°). A second hub 36B is used to change the direction of the track system 30 by ninety degrees (90°), but also includes a power box 38. A third hub 36C is used to connect three separate track sections 32. A fourth hub 36D is used to provide another power box 38.

Figure 18:
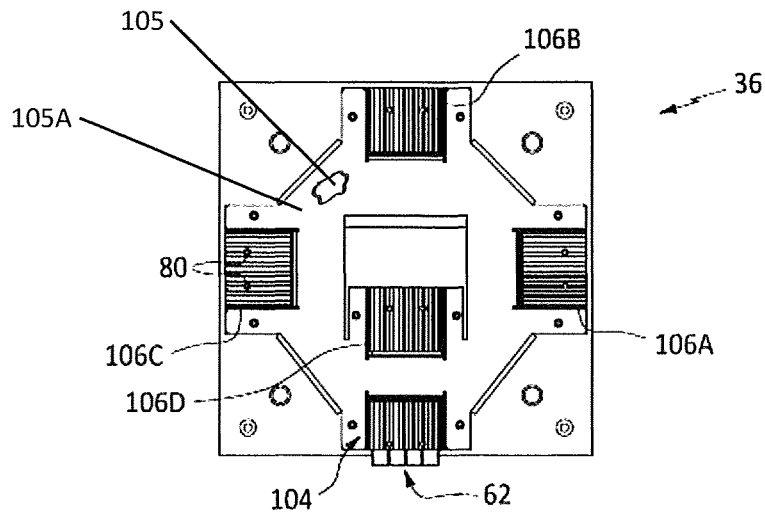
FIG. 18 is a diagrammatic top planar view of a hub embodiment.
Figure 18A:
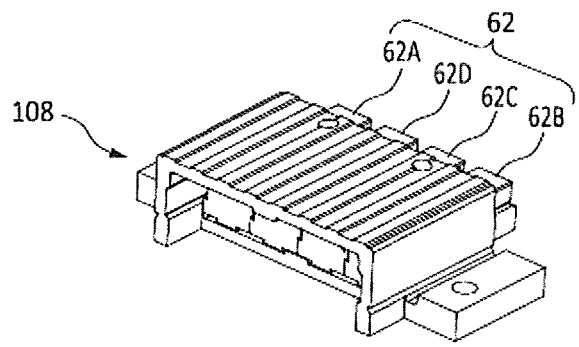
FIG. 18A is a diagrammatic perspective view of a port connector frame that may be included in a hub, illustrating a plurality of connectors held and positioned within the frame.

Referring to FIGS. 18-23, each hub 36 has a printed circuit board (PCB) 105 (disposed beneath a protective cover panel 105a as shown in FIG. 18) that is in communication with at least one input port 104 and at least one output port 106. The PCB 105 is preferably configured to have a thin profile; e.g., to maintain a low track system height, to facilitate system 30 cable 102 routing, etc. A useful embodiment of a hub 36 is one that has a four-sided configuration; e.g., a port 104, 106A, 106B, 106C on four opposite sides as shown in FIGS. 18-23. One side of the hub 36 includes an input port 104 having a plurality of input connectors 62 that are in communication with the PCB 105 and that are disposed for attachment with another system 30 component (e.g., a track section 32). In this embodiment, the three other sides of the hub 36 may each include an output port 106A, 106B, 106C having a plurality of output connectors 62 in communication with the PCB 105 and that are disposed for attachment with respective other system 30 components (e.g., a track section 32, or the like). In some embodiments, the hub 36 may also include a connection box output port 106D having a plurality of central connectors 62 in communication with the PCB 105 and that are disposed for attachment with another system component; e.g., a power box 38, or the like. In this hub 36 configuration, power can be input into the hub 36 through the input port 104 and is subsequently distributed to other system components via the three output ports 106A-C and the connection box output port 106D in communication with the PCB 105. FIG. 18A illustrates an example of port connector frame 108 that may be attached to the PCB 105 or to a substrate connected to the PCB 105. The port connector frame 108 has an interior cavity configuration similar to or the same as that of the enclosed channel interior cavity 60 of a track section 32. Specifically, the interior cavity is configured to mount and retain one or more electrical connectors 62. In some embodiments, the port connector frame 108 itself may be a modified portion of a track section 32. In FIGS. 18 and 18A, it can be seen that the port connector frames 108 are configured to retain four (4) Anderson Powerpole® connectors and may include pins 80 to facilitate locating and retaining the connectors 62 within the respective port connector frame 108. As indicated above, the Anderson Powerpole® connectors are an example of a type of wire connector that may be used, and the present disclosure is not limited thereto.

In the example hubs 36 shown in FIGS. 18-23, the input port 104, the output ports 106A-C, and the connection box output port 106D are each shown as including four (4) connectors 62, which is the same configuration as in the track sections 32, etc., to permit power communication between the system 30 components. Also, in the example hubs 36 shown in FIGS. 18-23, the connectors 62 are shown as Anderson Powerpole® type connectors.

Figure 19:
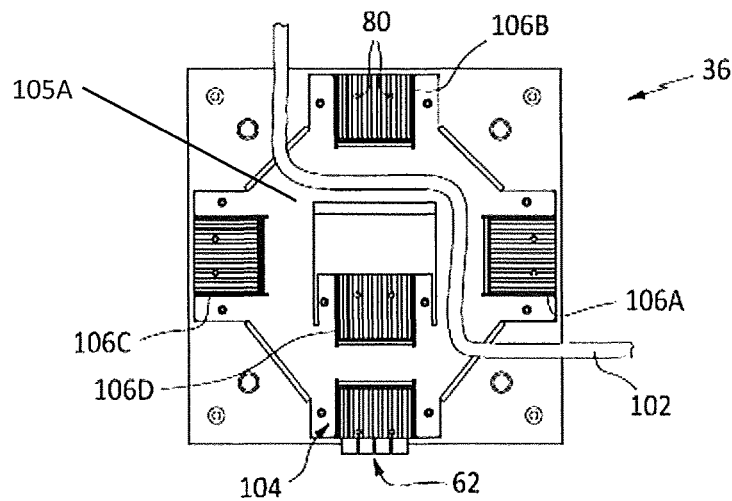
FIG. 19 is the top planar view of a hub embodiment shown in FIG. 18 with a cable routed therethrough.
Figure 20:
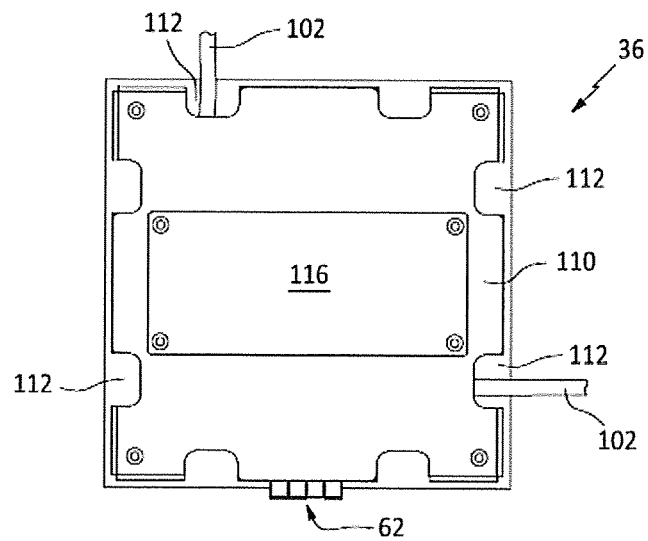
FIG. 20 is the top planar view of the hub embodiment shown in FIG. 19 with a cover plate attached to the hub.
Figure 21:
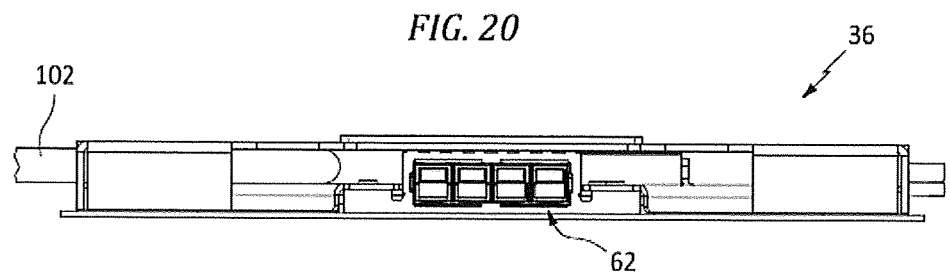
FIG. 21 is the side planar view of the hub embodiment shown in FIG. 20.
Figure 22:
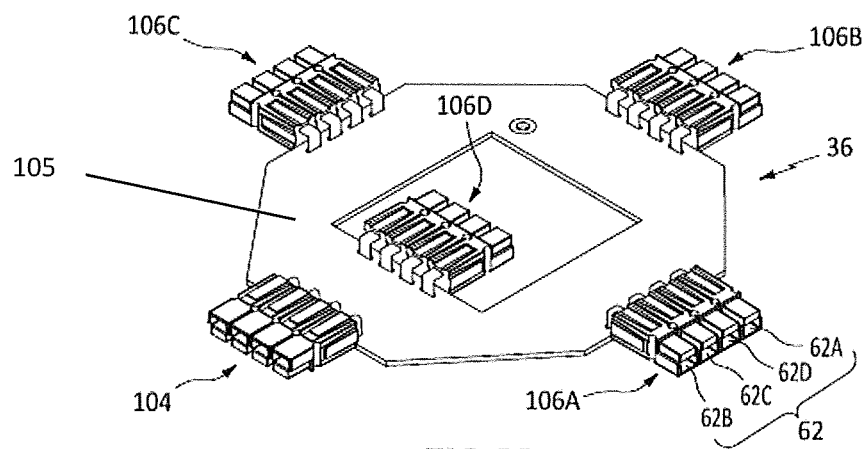
FIG. 22 is a diagrammatic perspective view of a hub embodiment.
Figure 22A:
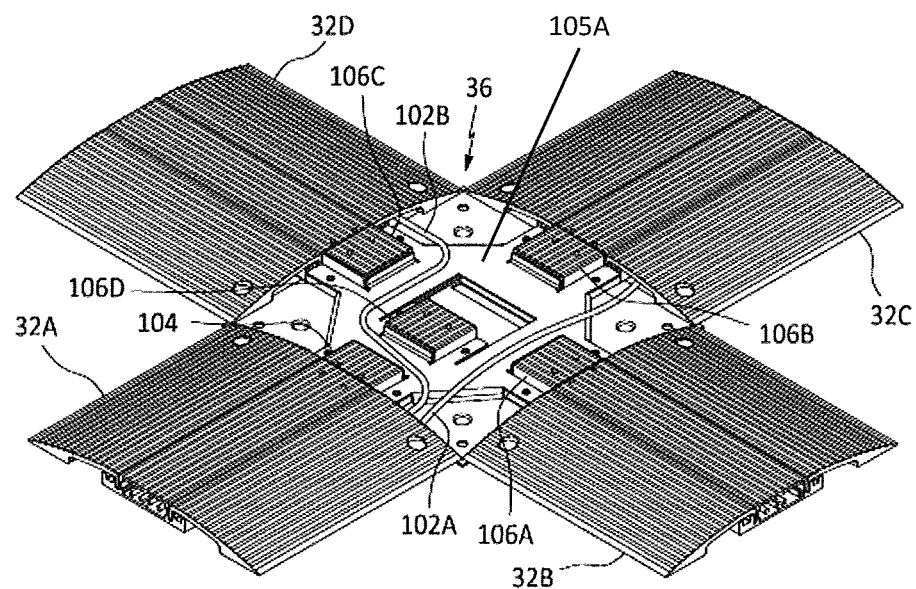
FIG. 22A is a diagrammatic perspective view of a hub embodiment with attached track sections.
Figure 23:
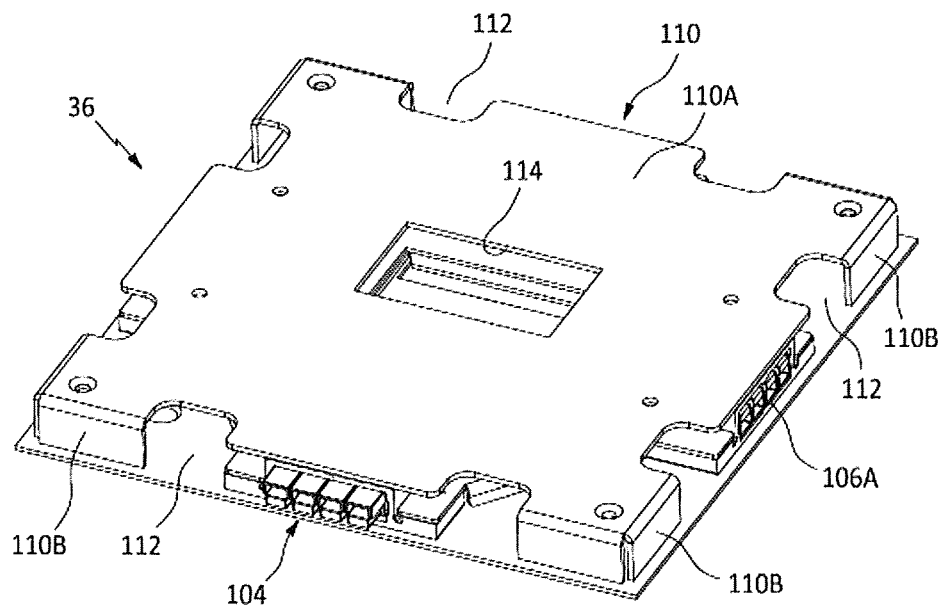
FIG. 23 is a diagrammatic perspective view of the hub embodiment shown in FIG. 22, with a cover plate attached.

Referring to FIGS. 20 and 23, the hub 36 may include a plurality of different cover plates 110 that are attachable to the hub 36. The cover plate may have a top panel 110A and side panels 110B that extend perpendicular to the top panel. The cover plate 110 embodiments are typically configured such that the cover plate 110 is flush with the top of a track section 32 that may be attached to the hub 36 to maintain the low height profile of the system 30. In some embodiments, two or more of the side panels 110B may include cable cutouts 112 that allow one or more cables 102 to enter the hub 36 and be routed to the appropriate other system 30 component; e.g., another track section 32, or the like. For example, as shown in FIGS. 19-21, a cable 102 (or the like) may be routed into a hub 36 (via a cable cutout 112) from a first track section 32 connected to the hub 36 and routed out of the hub 36 to a second track section 32 attached to the hub 36. The cover plate 110 covers the routing through the hub 36 and protects the cables 102 or the like passing through the hub 36. FIG. 22A diagrammatically illustrates a hub 36 (cover plate removed for illustration purposes) having four (4) track sections attached (one input track section 32A, three output track sections 32B, 32C, 32D) and illustrates a first cable 102A passing through the hub 36 from the input track section 32A to the second output track section 32C, and a second cable 102B passing through the hub 36 from the input track section 32A to the third output track section 32D. Hence, FIG. 22A illustrates the ability of the present system 30 to route a plurality of cables 102 internally within track system.

In some embodiments, the cover plate 110 may include a power box opening 114 (e.g., see FIG. 23) that permits a power box 38 to be in communication with the hub 36; specifically, with the connection box output port 106D. In some embodiments (e.g., see FIG. 20), the cover plate may include a cover panel 116 that can be selectively attached to the cover plate 110 to close the power box opening 114 when no power box 38 is to be connected.

Figure 24:
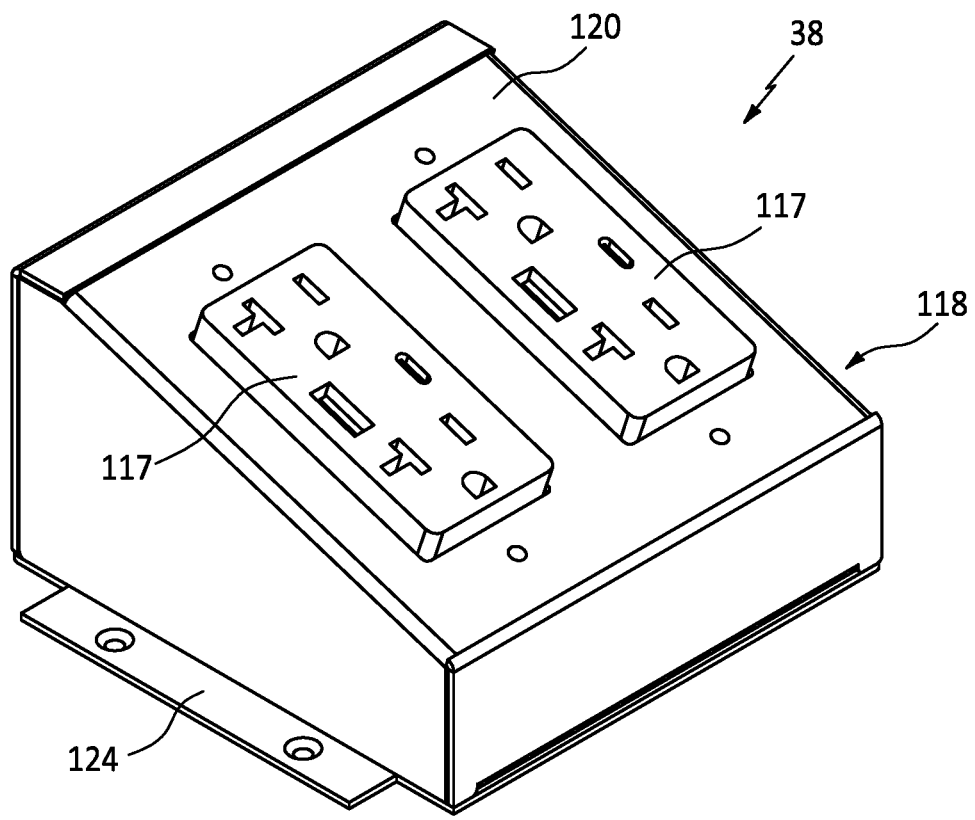
FIG. 24 is a diagrammatic perspective view of a power box embodiment.
Figure 25:
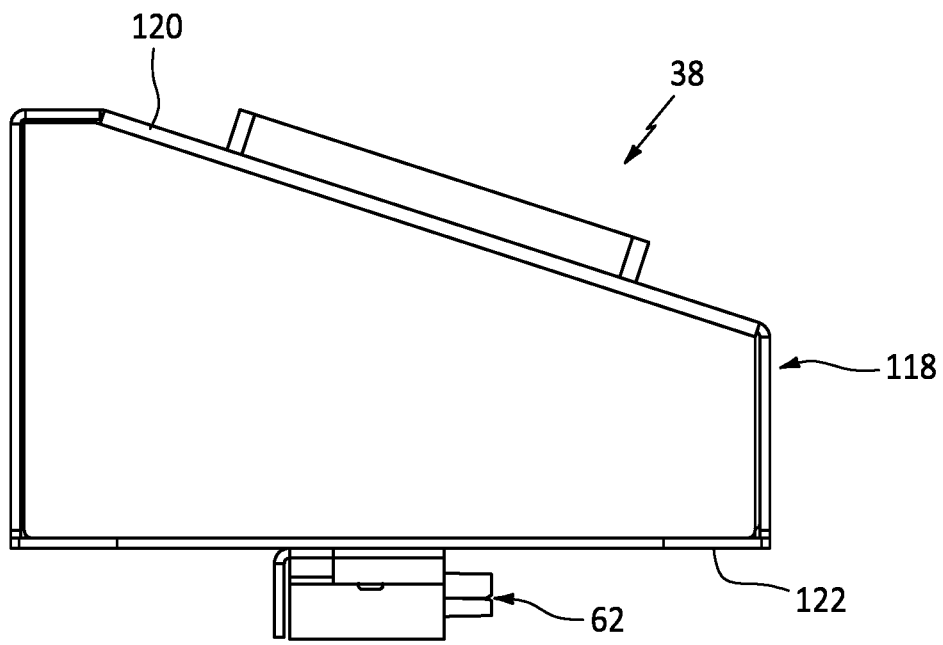
FIG. 25 is a side view of the power box embodiment shown in FIG. 24.
Figure 26:
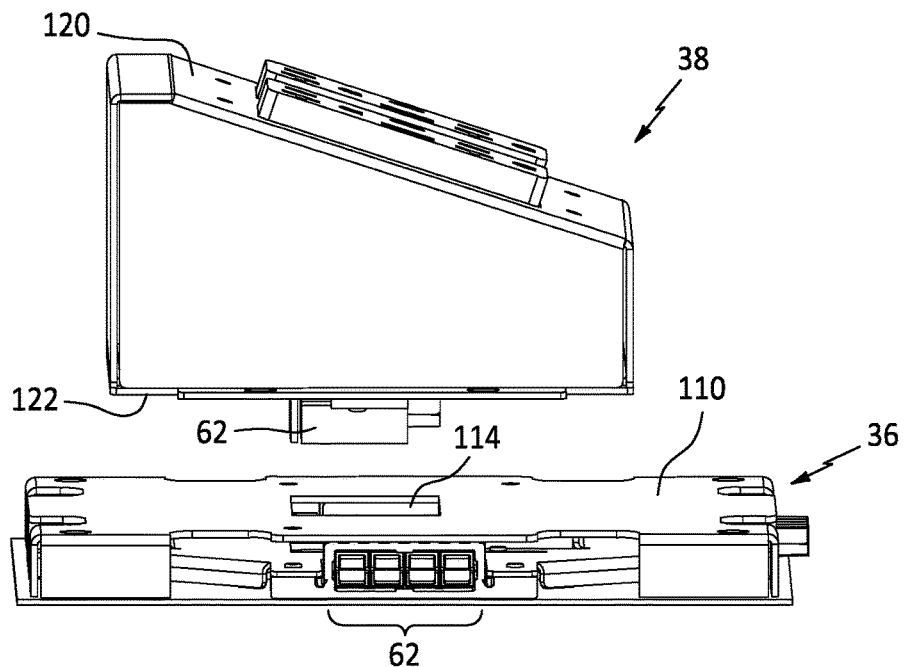
FIG. 26 is a diagrammatic side view of the power box embodiment shown in FIG. 25, now disposed over a hub embodiment.
Figure 27:
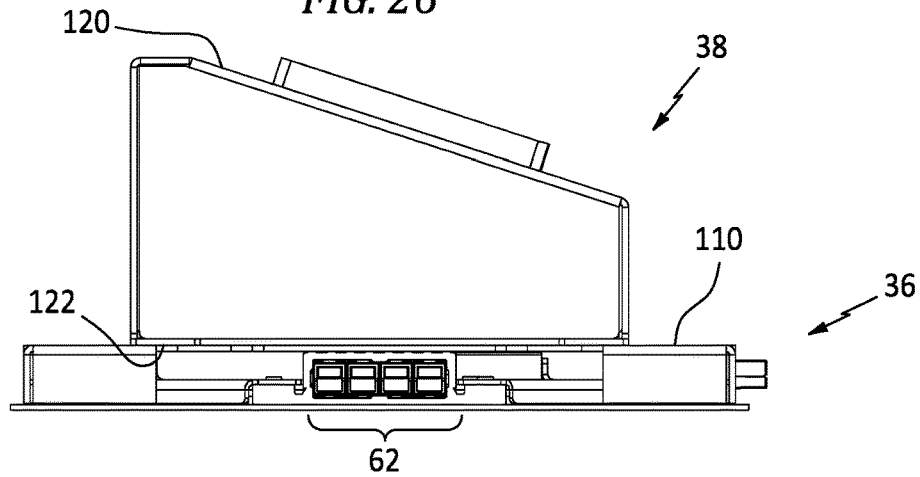
FIG. 27 is a diagrammatic side view of the power box embodiment shown in FIG. 25, now with connectors engaged with central connectors of the hub embodiment.
Figure 28:
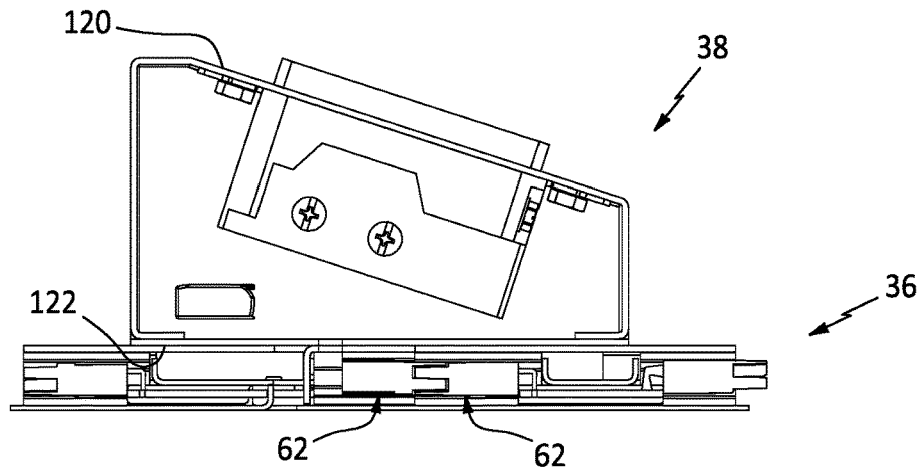
FIG. 28 is a diagrammatic sectional view of the coupled power box and hub shown in FIG. 27, sectioned to show the coupled connectors.

Referring to FIGS. 24-28, embodiments of the present disclosure system 30 include a variety of different power box 38 configurations. These power boxes 38 may be configured for mechanical attachment to a hub 36 and/or for electrical connection to a power source via a hub 36. A power box 38 may be configured with a variety of electrical connection ports that permit a user to plug into the power box to electrically power an independent device (e.g., a computer, a printer, a phone, etc.). In FIG. 24, for example, a power box 38 is shown having the following electrical connection ports 117: four (4) 120V AC outlets (3-prong), two universal serial bus (USB) outlets, and two USB type C outlets. The present disclosure is not limited to any particular power outlet type or combination of power outlet types.

Some power box 38 embodiments have a housing 118 that includes a first surface 120 that provides access to the power outlets and a base surface 122. The power box 38 embodiments may include a plurality of connectors 62 disposed below the base surface; see FIG. 25. As described above, a hub 36 may be configured with a plurality of central connectors 62 in communication with the hub 36 PCB and the hub cover plate 110 may include a power box opening 114. In these embodiments, a power box 38 may be electrically connected to a hub 36 by inserting the power box connectors 62 into the power box opening 114 of the hub cover plate 110; see FIG. 26. The power box 38 may then be moved laterally to engage the power box connectors 62 with the central connectors 62 of the hub 36; see FIGS. 27 and 28. As described above, the aforesaid connectors 62 may be mating pairs of Anderson Powerpole® connectors. Once the mating connectors 62 are connected with one another, the power box 38 may be mechanically attached to the hub cover plate; e.g., by a fastener such as a screw; FIG. 24 illustrates fastener tabs 124.

As indicated above, the present disclosure system 30 contemplates that various different types of connection boxes (e.g., power box 38) may be configured for engagement with a hub 36. The specific examples described herein include power boxes 38 configured to provide electrical connection ports 117 (AC, USB, etc.) that can be accessed by a user. In alternative embodiments, the present system 30 may include connection boxes that provide communications ports (e.g., ethernet ports), or video communications ports (e.g., HDMI, DVI, etc.), or low voltage ports, or any other electronic/digital communication line port that may be useful.

Figure 29:
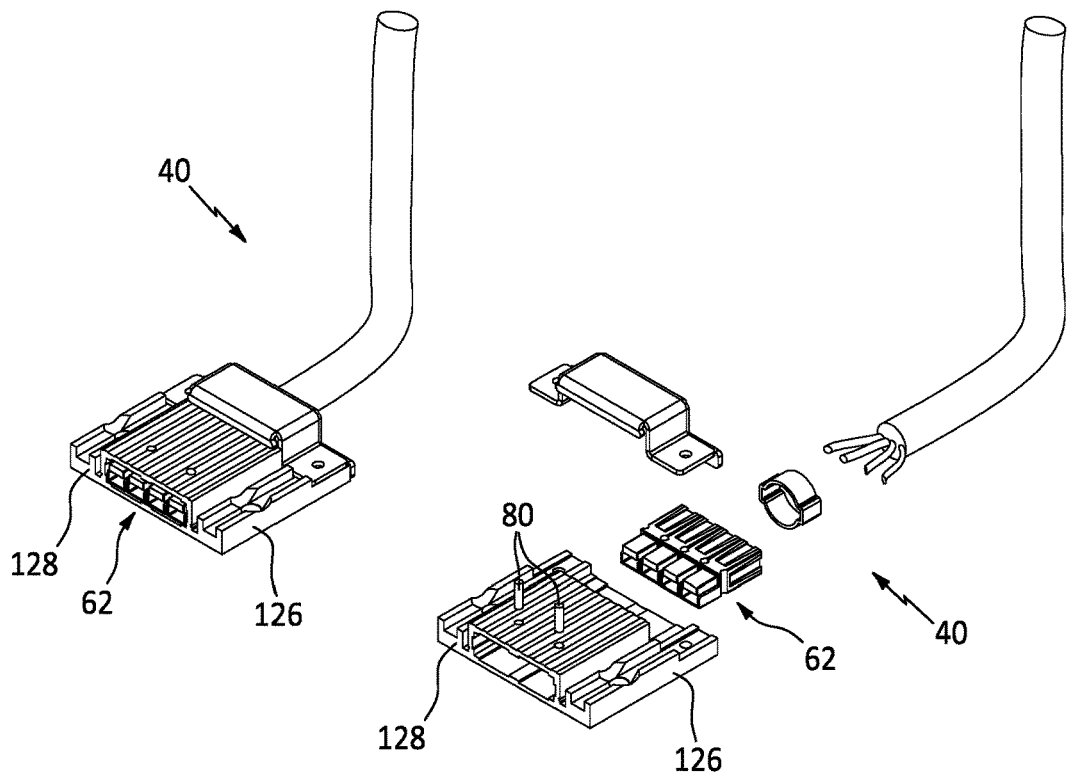
FIG. 29 shows a system infeed component embodiment in assembled and exploded form.
Figure 30:
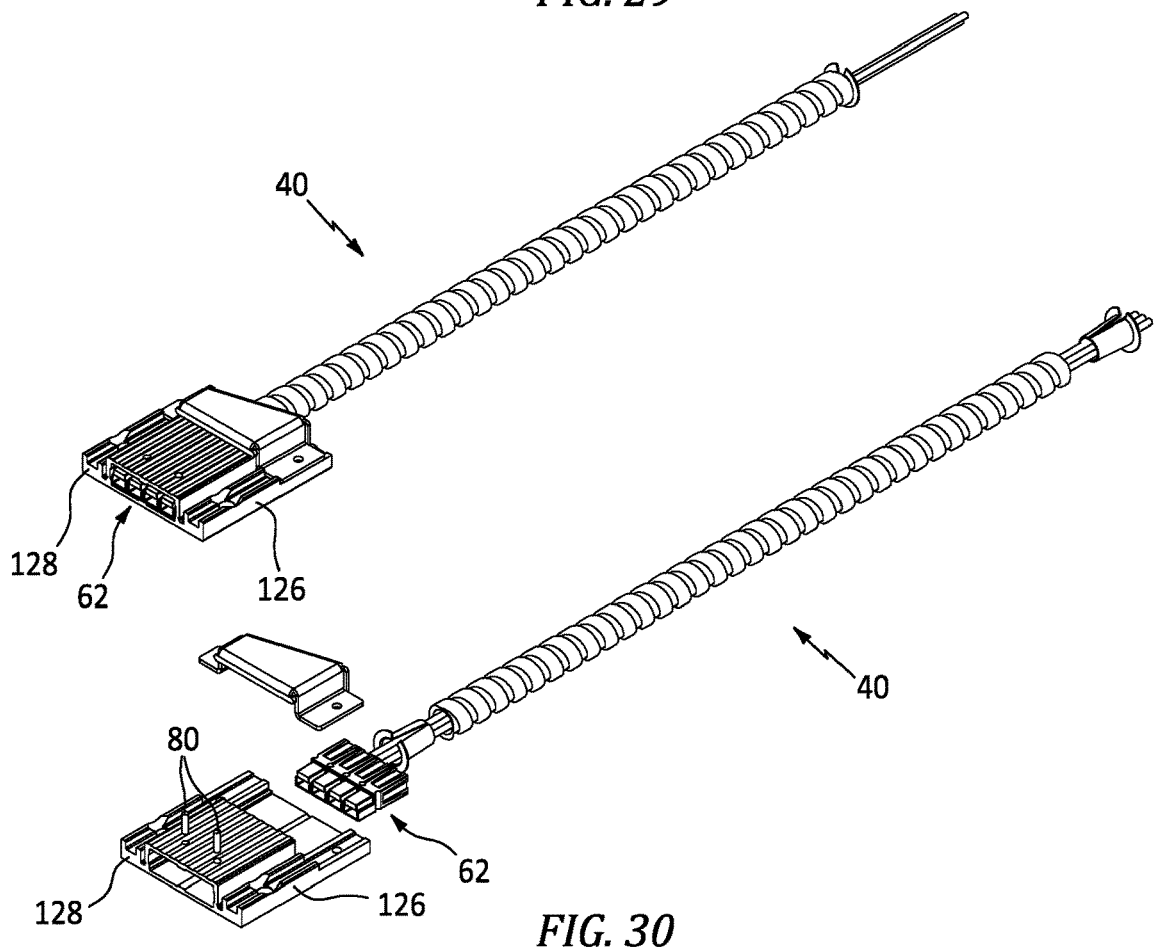
FIG. 30 shows a system infeed component embodiment in assembled and exploded form.

In some embodiments, the present KG track system 30 may include a system infeed component 40 that provides one or more of a power connection into the system 30. In FIG. 1, the diagrammatically shown system 30 includes a system infeed component 40 that is configured to provide power (e.g., AC power) into the track system 30. A first example of a system infeed component 40 is shown in FIG. 29 as a "soft cord" power cord with a connector 126 that can be mated with a track system 30 component; e.g., a track section 32, a system hub 36, or the like. This type of connector 126 may be used to provide electrical power from a wall or floor outlet into a present disclosure track system 30. FIG. 30 diagrammatically illustrates an alternative system infeed component 40 that is configured as a hardwire connection for providing power (e.g., AC power) into the track system 30. The hardwire includes a connector 126 similar to that in the software connection shown in FIG. 29 but is configured to accept a metal clad electrical cable, or a tubular electrical conduit or the like. This type of connector 126 may be used to provide electrical power from a wall outlet, a floor outlet, or the like into a present disclosure track system 30. In both system infeed component 40 embodiments shown in FIGS. 29 and 30, the system infeed component 40 may include a connector frame 128 having an interior cavity configuration similar to or the same as that of the enclosed cavity of a track section 32. The connector frame 128 itself may be a modified portion of a track section 32. The connector frame interior cavity is configured to mount and retain one or more electrical connectors 62; e.g., configured to retain four (4) Anderson Powerpole® connectors and may include pins 80 to facilitate locating and retaining the connectors 62 within the respective connector frame 128.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A track section for a track system, the track section comprising:
    an enclosed channel defined by a base wall, a cover wall, a first lateral side wall, and a second lateral side wall, the enclosed channel having an interior cavity, wherein the first lateral side wall and the second lateral side wall are disposed on opposite sides of the enclosed channel, and the base wall and the cover wall are spaced apart from one another and extend between the first lateral side wall and the second lateral side wall;
    a first lateral member extending laterally outward from the first lateral side wall, the first lateral member having a first ramp flange channel that includes a first tab channel that extends the length of the track section;
    a second lateral member extending laterally outward from the second lateral side wall, the second lateral member having a second ramp flange channel that includes a second tab channel that extends the length of the track section;
    wherein the track section is a unitary structure with the first lateral member and the second lateral member being integral with the enclosed channel, and has a length that extends between a first lengthwise end and an opposite second lengthwise end.

2. The track section of claim 1, wherein the base wall, the cover wall, the first lateral side wall, and the second lateral side wall each have a respective interior surface, the said interior surfaces defining the interior cavity of the enclosed channel;
    wherein the interior cavity is configured to mate with a plurality of electrical connectors.

3. The track section of claim 2, wherein the interior cavity configuration mates with four side by side electrical connectors to receive and position the electrical connectors.

4. The track section of claim 3, wherein each of the electrical connectors is an Anderson Powerpole type connector.

5. The track section of claim 1, wherein the track section further includes a first arrangement of electrical connectors disposed in the interior cavity at the first lengthwise end, and a second arrangement of electrical connectors disposed in the interior cavity at the second lengthwise end, wherein the first arrangement of electrical connectors and the second arrangement of electrical connectors are in electrical communication with each other.

6. The track section of claim 5, wherein the interior cavity is configured to mate with the first arrangement of electrical connectors disposed at the first lengthwise end and with the second arrangement of electrical connectors disposed at the second lengthwise end.

7. The track section of claim 5, wherein the first lengthwise end of the track section is configured to be an input end, and the second lengthwise end is configured to be an output end;
wherein the input end and the output end are configured to mate with one another, thereby permitting a said output end of a first track section to mate with a said input end of a second track section, thereby electrically connecting the first track section and the second track section.

8. The track section of claim 7, wherein the track section is initially formed by an extrusion process.

9. The track section of claim 1, wherein the unitary structure of the track section that includes the first lateral member, the second lateral member, and the enclosed channel is initially formed with a cross-sectional geometry in a width versus height plane that is uniform in a lengthwise direction.

10. A track system, comprising:
at least one track section, the track section having:
an enclosed channel defined by a base wall, a cover wall, a first lateral side wall, and a second lateral side wall, the enclosed channel having an interior cavity, wherein the first lateral side wall and the second lateral side wall are disposed on opposite sides of the enclosed channel, and the base wall and the cover wall are spaced apart from one another and extend between the first lateral side wall and the second lateral side wall; and
a first lateral member extending laterally outward from the first lateral side wall, the first lateral member having a first ramp flange channel;
a second lateral member extending laterally outward from the second lateral side wall, the second lateral member having a second ramp flange channel;
wherein the track section is a unitary structure with the first lateral member and the second lateral member being integral with the enclosed channel, and has a length that extends between a first lengthwise end and an opposite second lengthwise end;
at least one first track section ramp engaged with the first lateral member of a respective said track section;
at least one second track section ramp engaged with the second lateral member of a respective said track section;
wherein the at least first track section ramp and the at least one second track section ramp each have a triangular-like geometry that extends lengthwise; and
at least one hub having an input port, at least one output port, and a printed circuit board that electrically connects the input port and the at least one output port, wherein the input port is configured to mate with and electrically connect to a respective track section, and the at least one output port is configured to mate with and electrically connect to a connection box having at least one electrical connection port.

11. The track system of claim 10, wherein the base wall, the cover wall, the first lateral side wall, and the second lateral side wall each have a respective interior surface, the said interior surfaces defining the interior cavity of the enclosed channel;
wherein the interior cavity is configured to mate with a plurality of electrical connectors.

12. The track system of claim 10, wherein the unitary structure of the at least one track section that includes the first lateral member, the second lateral member, and the enclosed channel is initially formed with a cross-sectional geometry in a width versus height plane that is uniform in a lengthwise direction.

13. The track system of claim 10, wherein the at least one track section further includes a first arrangement of electrical connectors disposed in the interior cavity at the first lengthwise end, a second arrangement of electrical connectors disposed in the interior cavity at the second lengthwise end, wherein the first arrangement of electrical connectors and the second arrangement of electrical connectors are in electrical communication with each other.

14. The track system of claim 13, wherein the interior cavity is configured to mate with the first arrangement of electrical connectors disposed at the first lengthwise end and with the second arrangement of electrical connectors disposed at the second lengthwise end.

15. The track system of claim 13, wherein the at least one track section includes a first track section and a second track section, and the first lengthwise end of both the first track section and the second track section are each is configured to be an input end, and the second lengthwise end of both the first track section and the second track section are each configured to be an output end, and the input end and the output end are configured to mate with one another, thereby permitting the input end of the first track section to mate with the output end of the second track section.

16. The track system of claim 15, wherein the input port is configured to mate with and electrically connect to the second arrangement of electrical connectors at the output end of the first track section, and the at least one output port includes a second said output port that is configured to mate with and electrically connect to the first arrangement of electrical connectors at the input end of a second respective track section.

17. A track system, comprising:
a first track section assembly and a second track section assembly, each including:
a track section having:
an enclosed channel defined by a base wall, a cover wall, a first lateral side wall, and a second lateral side wall, the enclosed channel having an interior cavity, wherein the first lateral side wall and the second lateral side wall are disposed on opposite sides of the enclosed channel,
and the base wall and the cover wall are spaced apart from one another and extend between the first lateral side wall and the second lateral side wall; and
a first lateral member extending laterally outward from the first lateral side wall, the first lateral member having a first ramp flange channel;
a second lateral member extending laterally outward from the second lateral side wall, the second lateral member having a second ramp flange channel;
wherein said track section is a unitary structure with the first lateral member and the second lateral member being integral with the enclosed channel, and has a length that extends between a first lengthwise end and an opposite second lengthwise end;

wherein said track section includes a first arrangement of electrical connectors disposed in the interior cavity at the first lengthwise end and a second arrangement of electrical connectors disposed in the interior cavity at the second lengthwise end and in electrical communication with the first arrangement of electrical connectors; and a first track section ramp, configured to be engaged with the first lateral member of the track section; and a second track section ramp, configured to be engaged with the second lateral member of the track section;

wherein the at least first track section ramp and the at least one second track section ramp each have a triangular-like geometry that extends lengthwise; and at least one hub having an input port and at least one output port, the input port configured to mate with and electrically connect to a said respective second arrangement of electrical connectors of a respective said track section, the hub including a printed circuit board that electrically connects the input port and the at least one output port; and wherein the at least one hub is configured to permit a cable extending out from the first track section ramp or the second track section ramp of the first track section assembly or the second track section assembly to pass through the hub and into the first track section ramp or the second track section ramp of the other of the first track section assembly or the second track section assembly.

18. The track system of claim 17, wherein the at least one hub includes a cover plate, and the cable passes through the hub beneath the cover plate.

19. The track system of claim 17, wherein the hub is configured to connect to a connection box having at least one communication line port.

20. A track system, comprising:
at least one track section, the track section having:
an enclosed channel defined by a base wall, a cover wall, a first lateral side wall, and a second lateral side wall, the enclosed channel having an interior cavity, wherein the first lateral side wall and the second lateral side wall are disposed on opposite sides of the enclosed channel, and the base wall and the cover wall are spaced apart from one another and extend between the first lateral side wall and the second lateral side wall;
a first lateral member extending laterally outward from the first lateral side wall, the first lateral member having a first ramp flange channel; and
a second lateral member extending laterally outward from the second lateral side wall, the second lateral member having a second ramp flange channel;
wherein the track section is a unitary structure with the first lateral member and the second lateral member being integral with the enclosed channel, and has a length that extends between a first lengthwise end and an opposite second lengthwise end;
at least one first track section ramp engaged with the first lateral member of a respective said track section; and
at least one second track section ramp engaged with the second lateral member of a respective said track section;
wherein the at least first track section ramp and the at least one second track section ramp each have a triangular-like geometry that extends lengthwise; and
wherein the first ramp flange channel includes a first tab channel that extends the length of the track section; and
the at least one first track section ramp includes a first flange having a first tab that extends the length of the at least one first track section ramp, and the first ramp flange channel, the first tab channel, the first flange, and the first tab are configured such that the first flange is receivable within the first ramp flange channel, and rotation of the first flange relative to the first ramp flange channel received therein causes the first tab to engage with the first tab channel.

* * * * *